United States Patent
Kim et al.

(10) Patent No.: US 9,342,678 B2
(45) Date of Patent: May 17, 2016

(54) METHOD FOR CONTROLLING CONTENT AND DIGITAL DEVICE USING THE SAME

(71) Applicant: LG ELECTRONICS INC., Seoul (KR)

(72) Inventors: Yongsin Kim, Seoul (KR); Jihwan Kim, Seoul (KR); Sihwa Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/448,502

(22) Filed: Jul. 31, 2014

(65) Prior Publication Data

US 2014/0344954 A1 Nov. 20, 2014

Related U.S. Application Data

(63) Continuation-in-part of application No. 14/022,013, filed on Sep. 9, 2013, now Pat. No. 8,813,251, which is a continuation of application No. 13/770,740, filed on Feb. 19, 2013, now Pat. No. 9,043,940.

(60) Provisional application No. 61/697,814, filed on Sep. 7, 2012.

(30) Foreign Application Priority Data

Sep. 28, 2012 (KR) .................. 10-2012-0108667
May 14, 2013 (KR) .................. 10-2013-0054333

(51) Int. Cl.
*G06F 21/32* (2013.01)
*G06F 3/0485* (2013.01)
(Continued)

(52) U.S. Cl.
CPC .............. *G06F 21/32* (2013.01); *G06F 3/0482* (2013.01); *G06F 3/0485* (2013.01); *H04L 63/0861* (2013.01); *H04L 63/105* (2013.01); *G06F 21/31* (2013.01); *G06F 21/6218* (2013.01)

(58) Field of Classification Search
CPC ...... G06F 21/32; G06F 21/31; G06F 21/6218; G06F 3/0485; G06F 3/0482; H04L 63/105; H04L 63/0861
See application file for complete search history.

(56) References Cited

U.S. PATENT DOCUMENTS

2002/0026581 A1 2/2002 Matsuyama et al.
2003/0237093 A1 12/2003 Marsh
(Continued)

FOREIGN PATENT DOCUMENTS

| | | |
|---|---|---|
| FR | 2 887 577 A1 | 9/2005 |
| JP | 2008-134769 A | 6/2008 |
| KR | 10-2012-0053296 A | 5/2012 |

*Primary Examiner* — Kaveh Abrishamkar
*Assistant Examiner* — Ayoub Alata
(74) *Attorney, Agent, or Firm* — Birch, Stewart, Kolasch & Birch, LLP

(57) ABSTRACT

The present specification discloses a method for controlling a thumbnail image page including thumbnail images with respect to visual information for which security is set, and a digital device using the same. The digital device according to the present specification provides a first thumbnail image page mode ("first mode" hereinafter) to a display unit when security information on a user corresponds to predetermined security information and provides a second thumbnail image page mode ("second mode" hereinafter) to the display unit when the security information on the user does not correspond to the predetermined security information. For example, the thumbnail image page displays thumbnail images with respect to visual information for which security is set in the first mode, whereas the thumbnail image page does not display thumbnail images with respect to visual information for which security is set in the second mode.

18 Claims, 24 Drawing Sheets

(51) Int. Cl.
*G06F 3/0482* (2013.01)
*H04L 29/06* (2006.01)
*G06F 21/31* (2013.01)
*G06F 21/62* (2013.01)

(56) References Cited

U.S. PATENT DOCUMENTS

| | | |
|---|---|---|
| 2004/0139330 A1 | 7/2004 | Baar |
| 2007/0008066 A1 | 1/2007 | Fukuda |
| 2009/0141948 A1* | 6/2009 | Nakaoka ................ G06F 21/32 382/118 |
| 2009/0315922 A1* | 12/2009 | Lee ....................... G06F 3/0488 345/698 |
| 2010/0225607 A1 | 9/2010 | Kim |
| 2010/0240415 A1* | 9/2010 | Kim .................... G06F 3/03547 455/565 |
| 2011/0078771 A1 | 3/2011 | Griffin |
| 2011/0167385 A1* | 7/2011 | Charrue ............. H04N 5/44543 715/825 |
| 2011/0184828 A1 | 7/2011 | Siegel et al. |
| 2011/0287741 A1 | 11/2011 | Prabhu |
| 2012/0044156 A1 | 2/2012 | Michaelis et al. |
| 2012/0268248 A1 | 10/2012 | Hiraide |

* cited by examiner (a)

(b)

(c)

(a)

(b)

(c)

METHOD FOR CONTROLLING CONTENT AND DIGITAL DEVICE USING THE SAME

CROSS REFERENCE TO RELATED APPLICATIONS

This application is a Continuation-in-Part of copending U.S. application Ser. No. 14/022,013 filed on Sep. 9, 2013, which is a Continuation of U.S. application Ser. No. 13/770,740 filed on Feb. 19, 2013, which claims the benefit of the U.S. Provisional Patent application Ser. No. 61/697,814 filed on Sep. 7, 2012 and claims priority under 35 U.S.C. 119(a) to Korean Patent Application Ser. No. 10-2012-0108667, filed on Sep. 28, 2012. U.S. application Ser. No. 14/022,013 claims the benefit of the U.S. Provisional Patent Application No. 61/697,814 filed on Sep. 7, 2012 and claims priority under 35 U.S.C. 119(a) to Korean Patent Application No. 10-2012-0108667, filed on Sep. 28, 2012. U.S. patent application Ser. No. 13/945,597 is a Continuation-in-Part of U.S. patent application Ser. No. 13/770,740 filed on Feb. 19, 2013, and claims the benefit of the U.S. Provisional Patent Application No. 61/697,814 filed on Sep. 7, 2012 and claims priority under 35 U.S.C. 119(a) to Korean Patent Application Nos. 10-2012-0108667 and 10-2013-0054333, filed on Sep. 28, 2012 and May 14, 2013, all of which are hereby incorporated by reference as if fully set forth herein.

BACKGROUND OF THE INVENTION

1. Field of the Invention

The present specification relates to a method for controlling content and a digital device using the same. More specifically, the invention relates to a method for changing a display page provided to a display unit from among content including a plurality of display pages and a digital device using the same.

2. Discussion of the Related Art

Digital devices process digital data and perform operations corresponding to the digital data. As the performance of these digital devices improves, various types of multimedia content can be executed through the digital devices. Particularly, a widely used recent portable device is used as a multipurpose multimedia playback device.

A user can set a digital device such that only the user can access specific content when multimedia content is executed through the digital device. For example, the user can restrict access to specific pictures, texts, applications, etc., stored in the digital device, by other people such that they can be used only by the user. In this case, the user can restrict access to the specific content by others by locking the content through the digital device. The user needs to unlock the lock state in order to access the content.

However, a user interface for unlocking the lock state of the content causes user inconvenience when the user uses content. That is, the user should input an additional password or pass through an authentication procedure in order to unlock the lock state of the content. Accordingly, there is a need for a method by which the user can access locked content without an additional authentication procedure when using the digital device.

SUMMARY OF THE INVENTION

An object of the present specification is to provide a digital device and a method for controlling the same.

To accomplish the object of the present invention, a digital device includes: a sensor unit configured to output user input or information as a signal; a display unit configured to output images; and a processor configured to receive the signal of the sensor unit and to control the display unit, wherein the processor is configured to provide, to the display unit, a thumbnail image page including a thumbnail image with respect to at least one piece of visual information, wherein the sensor unit is configured to output signals with respect to user input for scrolling the thumbnail image page and security information on a user, wherein the processor is configured to provide a first thumbnail image page mode ("first mode" hereinafter) to the display unit when the security information on the user corresponds to predetermined security information and to provide a second thumbnail image page mode ("second mode" hereinafter) to the display unit when the security information on the user does not correspond to the predetermined security information.

The thumbnail image page may include thumbnail images with respect to visual information for which security is set in the first mode and may not include thumbnail images with respect to visual information for which security is set in the second mode.

According to an embodiment of the present specification, a scroll speed of the first mode may be lower than a scroll speed of the second mode.

According to another embodiment of the present specification, the number of thumbnail images included in a first region, included in the thumbnail image page and displayed through the display unit, in the second mode may be greater than the number of thumbnail images included in the first region in the first mode.

According to another embodiment of the present specification, the size of the thumbnail image in the second mode may be less than the size of the thumbnail image in the first mode.

According to an embodiment of the present specification, a scroll operation may be limited such that a thumbnail image, related to visual information for which security is set and located in a second region, is not included in the first region included in the thumbnail image page and displayed through the display unit according to scroll input of a user in the first mode, the second region being included in the thumbnail image page but not being displayed through the display unit. Here, the first mode may enable a thumbnail image, related to visual information for which security is set and located in the second region, to be included in the first region when scroll input is applied within a predetermined time after the scroll operation is limited.

According to another embodiment of the present specification, the first mode may enable a thumbnail image of the visual information for which security is set to be replaced by a predetermined thumbnail image after the lapse of a predetermined time from when the security information on the user is received.

According to another embodiment of the present specification, the first mode may enable a thumbnail image of the visual information for which security is set to be replaced by a thumbnail image of lower resolution than the thumbnail image after the lapse of a predetermined time from when the security information on the user is received.

According to another embodiment of the present specification, the first mode may enable a thumbnail image of the visual information for which security is set to be replaced by a smaller thumbnail image than the thumbnail image after the lapse of a predetermined time from when the security information on the user is received.

According to another embodiment of the present specification, the first mode may enable a thumbnail image of the visual information for which security is set to be replaced by a thumbnail image corresponding to part of the visual information for which security is set after the lapse of a predetermined time from when the security information on the user is received.

According to another embodiment of the present specification, the first mode may enable a thumbnail image of the visual information for which security is set to be excluded from the thumbnail image page after the lapse of a predetermined time from when the security information on the user is received. In this case, a position corresponding to the excluded thumbnail image may remain empty, and a thumbnail image of visual information for which security is not set may be moved to the position corresponding to the excluded thumbnail image. In addition, the first mode may enable the excluded thumbnail image of the visual information for which security is set to be returned to the original position thereof in the first region included in the thumbnail image page and displayed through the display unit and may enable the excluded thumbnail image of the visual information for which security is set to be located in the second region included in the thumbnail image page but not displayed through the display unit, when security information on a user, received after the thumbnail image of the visual information for which security is not set is moved to the position of the excluded thumbnail image, is consistent with predetermined security information.

According to an embodiment of the present specification, the sensor unit may include a fingerprint sensor, wherein the security information of the user is fingerprint information of the user. Here, the fingerprint sensor may extract fingerprint information of a user from user input for scrolling the thumbnail image page.

According to another embodiment of the present specification, the sensor unit may include a camera capturing an image of a user's face, wherein the security information on the user corresponds to information of the user's face.

To accomplish the object of the present invention, a method for controlling a digital device including a processor configured to control a thumbnail image page including thumbnail images with respect to at least one piece of visual information to be displayed through a display unit includes: (a) the processor receiving, from a sensor unit, signals with respect to user input for scrolling the thumbnail image page and security information on a user; (b) the processor determining whether the security information on the user corresponds to predetermined security information; and (c) the processor providing a first thumbnail image page mode ("first mode" hereinafter) to the display unit when the security information on the user corresponds to the predetermined security information and providing a second thumbnail image page mode ("second mode" hereinafter) to the display unit when the security information on the user does not correspond to the predetermined security information.

According to one aspect of the present specification, it is possible to prevent information about whether visual information for which security is set is present and contents thereof from exposure to unauthenticated users by providing thumbnail images with respect to security-set visual information to an authenticated user only.

According to another aspect of the present specification, it is possible to prevent information about presence of security-set visual information and contents thereof from being exposed to unauthenticated users by adjusting disposition of thumbnail images, the size of a thumbnail image, a scroll speed or the like.

According to another aspect of the present specification, an authenticated user can predict presence of thumbnail images with respect to visual information for which security is set and display of the thumbnail images through a display unit according to restriction of scroll operation.

According to another aspect of the present specification, it is possible to prevent information about presence of security-set visual information and contents thereof from being exposed to unauthenticated users by excluding thumbnail images with respect to visual information for which security is set from the thumbnail image page after the lapse of a predetermined time from when security information on a user is received.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Although the terms used in the present specifications are selected from generally known and used terms, the terms may be changed according to the intention of an operator, customs, or the advent of new technology. Some of the terms mentioned in the description of the present specification have been selected by the applicant at his or her discretion, the detailed meanings of which are described in relevant parts of the description herein. Therefore, the present specification must be understood, not simply by the actual terms used but by the meanings of each term.

The present specification relates to a method for controlling content including a plurality of display pages and a digital device using the same. In the present specification, digital pages include various types of multimedia content that can be provided to a display unit of a digital device. For example, the display pages can be various types of displayable data including an image, a document, a picture, a home screen and combinations thereof. The plurality of display pages included in the content may belong to the same or equivalent layer and form a sequence.

The plurality of display pages included in the content may be sequentially provided to a user according to the sequence. For example, if the content is a gallery application including a plurality of pictures, the user can view the plurality of pictures according to the sequence through the display unit of the digital device. If the content is a home screen sequence including a plurality of home screens, the user can sequentially change home screens displayed on the display unit of the digital device.

According to an embodiment of the present specification, the content includes at least one locked display page. The locked display page is a display page permitted to be accessed only by a specific user and can be provided to the specific user through the display unit only when the user is authenticated. According to an embodiment of the present specification, the digital device can extract fingerprint information of the corresponding user from user input for changing pages of the content and perform user authentication on the basis of the extracted fingerprint information. The digital device determines whether or not to provide the locked display page to the user on the basis of the extracted fingerprint information. That is, when the digital device determines that the user is allowed to access the locked display page on the basis of the extracted fingerprint information, the digital device can provide the locked display page to the user in response to the user input. If the digital device determines that the user is not allowed to access the locked display page, the digital device can provide a display page other than the locked display page to the user in response to the user input. This will be described in detail later.

Figure 1:
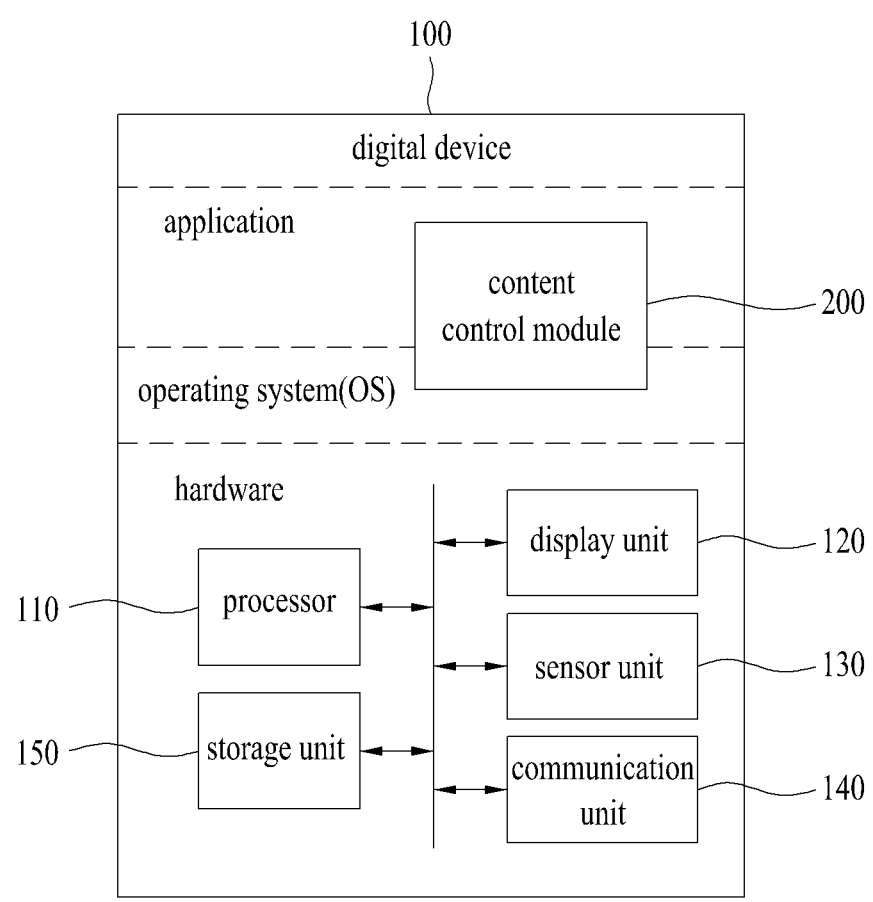
FIG. 1 is a block diagram of a digital device according to an embodiment of the present specification.

FIG. 1 is a block diagram of a digital device 100 according to an embodiment of the present specification.

Referring to FIG. 1, the digital device 100 may include a hardware layer, an operating system (OS) layer, and an application layer.

The hardware layer of the digital device 100 may include a processor 110, a display unit 120, a sensor unit 130, a communication unit 140, and a storage unit 150.

The display unit 120 outputs an image on a display screen. The display unit 120 can output an image on the basis of content executed by the processor 110 or a control command of the processor 110. In an embodiment of the present specification, the display unit 120 can output a display page of content executed by the digital device 100.

The sensor unit 130 may detect the surrounding environment of the digital device 100 using at least one sensor provided to the digital device 100 and signal the detected surrounding environment to the processor 110. In addition, the sensor unit 130 may detect user input according to the present specification and signal the user input to the processor 110. The sensor unit 130 may include at least one sensing means. The at least one sensing means may include a gravity sensor, a geomagnetic sensor, a motion sensor, a gyro sensor, an acceleration sensor, an infrared sensor, an inclination sensor, an illumination sensor, an altitude sensor, an odor sensor, a temperature sensor, a depth sensor, a pressure sensor, a bending sensor, an audio sensor, a video sensor, a global positioning system (GPS) sensor, a touch sensor, a fingerprint sensor, etc. The sensor unit 130 can sense various user inputs and user environments and transmit sensing results to the processor 110 such that the processor 110 can perform operations corresponding to the sensing results. The aforementioned sensors may be included in the digital device 100 as separate elements or may be integrated into one or more elements and included in the digital device 100.

According to an embodiment of the present specification, the digital device 100 may include the sensor unit 130 provided on the display unit 120. Accordingly, the digital device 100 can detect various user inputs to or above the display unit 120 through the sensor unit 130. For example, if the sensor unit 130 includes a touch sensor, the digital device 100 can receive various user touch inputs to the display unit 120. Also, for example, the sensor unit 130 can receive gesture input to the display unit 120. Herein, the gesture input may include hovering input. Hovering means that the hand of the user or the object does not touches the display unit 120, but stays at a certain distance from the point to be touched. Also, for example, the sensor unit 130 can receive complex touch gesture input to the display unit 120. The complex touch gesture input can represent complex input of touch input and gesture input. For example, the complex touch gesture input can be performed by Swept Frequency Capacitive Sensing (SFCS). Herein, SFCS can represent not only detect a touch event, but also recognize complex configurations of the user hands and body. If the sensor unit 130 includes a fingerprint sensor, the digital device 100 can acquire fingerprint information of a corresponding user from a user input applied to the display unit 120. The digital device 100 according to the present specification may include a screen sensor in a layered structure formed by the display unit 120 and the sensor unit 130.

According to another embodiment of the present specification, the digital device 100 may include both the touch sensor and the fingerprint sensor. The touch sensor and the fingerprint sensor may form a layered structure and the digital device can acquire fingerprint information of the corresponding user from user input applied to the touch sensor. The touch sensor and the fingerprint sensor can form a layer with the display unit 120 or form a layer separately from the display unit 120. Also, the digital device 100 can acquire fingerprint information of the corresponding user from the gesture input.

The communication unit 140 may transmit/receive data by communicating with an external device or server using various protocols. The communication unit 140 can be connected to a server or a cloud computing farm through a network to transmit/receive digital data, for example, content. The communication unit 140 may be selectively included in the digital device 100.

The storage unit 150 may store various types of digital data such as video, audio, pictures, texts, applications, etc. The storage unit 150 may correspond to a digital data storage space such as a flash memory, a random access memory (RAM), a solid state drive (SSD), etc. In an embodiment of the present specification, the storage unit 150 can store various types of content. In addition, the storage unit 150 can store content received by the communication unit 140 from an external device or server.

The processor 110 may execute content stored in the storage unit 150 or content received through data communication. The processor 110 can execute various applications and process internal data of the digital device 100. In an embodiment of the present specification, the processor 110 may drive a content control module 200 and control content of the digital device 100 on the basis of a control command of the content control module 200. In addition, the processor 110 may control the respective units of the digital device 100 and control data transmission/reception between units.

The OS layer of the digital device 100 may include an OS for controlling the units of the digital device 100. The OS allows an application of the digital device 100 to control and use the units of the hardware layer. The OS efficiently distributes resources of the digital device 100 to prepare an environment in which each application can be executed. The application layer of the digital device 100 may include at least one application. The application includes various types of programs for performing a specific operation. The application can use the resources of the hardware layer with the help of the OS.

According to an embodiment of the present specification, the digital device 100 includes the content control module 200 for controlling content. The content control module 200 controls change of a plurality of display pages included in content of the digital device 100. The content control module 200 may be included in the OS layer or the application layer of the digital device 100. That is, the content control module 200 may be embedded software included in the OS layer of the digital device 100 or software included in the application layer.

FIG. 1 shows elements of the digital device 100 according to an embodiment of the present specification as logical elements. The elements of the digital device 100 can be integrated as one chip or a plurality of chips in the digital device according to device design.

Figure 2:
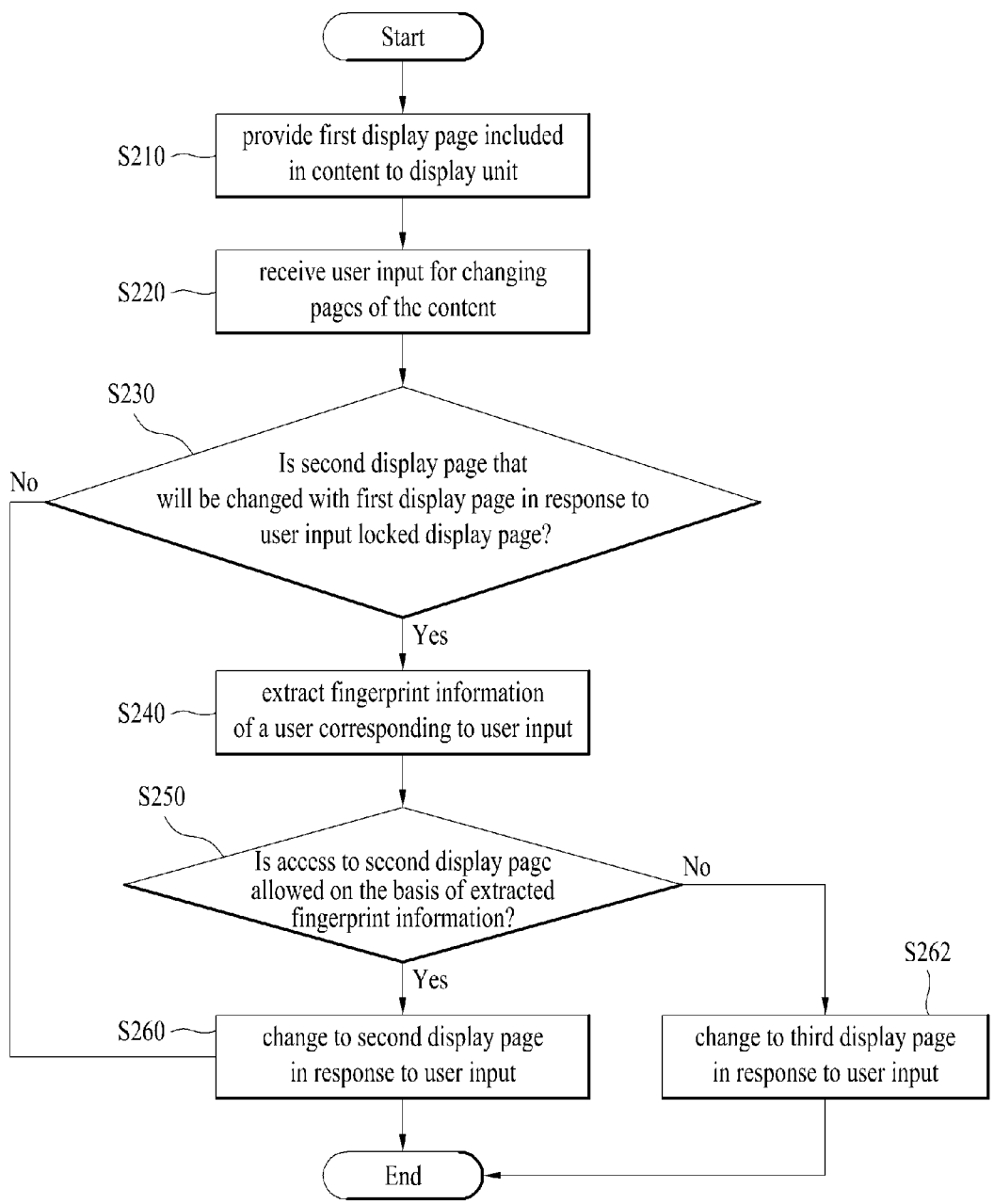
FIG. 2 is a flowchart illustrating a method for controlling content according to an embodiment of the present specification.

FIG. 2 is a flowchart illustrating a method for controlling content according to an embodiment of the present specification. Each step of the method shown in FIG. 2 may be performed by the digital device according to the present specification. That is, the processor 110 of the digital device 100 can control each step of FIG. 2 on the basis of control commands of the content control module 200 of the digital device 100 shown in FIG. 1.

The digital device according to the present specification may provide a first display page included in content to the display unit (S210). The content includes a plurality of display pages in sequence. For example, the content can be a gallery application including a plurality of pictures, a digital document including a plurality of pages, or a home screen sequence including a plurality of home screens. However, the present specification is not limited thereto. The content includes a plurality of display pages arranged in a sequence. This sequence arrangement includes one-dimensional arrangement, two-dimensional arrangement and three-dimensional arrangement. If the content is a sequence in one-dimensional arrangement, display pages other than the first display page included in the content may be located before and/or after (or located at left and/or right of) the first display page. If the content is a sequence in two-dimensional arrangement, display pages other than the first display page included in the content may be located in at least one of directions corresponding to the top, bottom, left, right and combinations thereof of the first display page. If the content is a sequence in three-dimensional arrangement, display pages other than the first display page included in the content may be located in at least one of directions corresponding to the front, back, top, bottom, left, right and combinations thereof of the first display page. The arrangement directions are arbitrary arrangement directions for explaining the sequence arrangement of the present specification and can be modified to various embodiments.

The display pages included in the content may be provided to the display unit of the digital display. The first display page of the content provided to the display unit may be changed to other display pages according to user input. In this case, display page change may be sequentially performed on the basis of the sequence arrangement of the content. For example, the first display page of the content provided to the display unit can be changed to a second display page in the vicinity of the first display page according to user input. The second display page is located in the content sequence in a direction in which a display page change is performed according to the user input. If the second display page is a display page in a locked state, which is permitted to be accessed only by a specific user, the digital device can perform display page change according to whether the corresponding user is permitted to access the second display page.

The digital device receives user input for changing content pages (S220). This user input determines a change direction in which a page change is performed. For example, the user input can include various user inputs having direction information, such as sliding input, touch input of a page change interface, gesture input, complex touch gesture input, etc. The digital device can perform content page change on the basis of the direction information included in the user input. That is, the digital device can set a content page change direction on the basis of the direction information and change the current content page to a display page located in the content page change direction in the sequence.

According to an embodiment of the present specification, the user input may include fingerprint information of the corresponding user. The touch sensor and the fingerprint sensor included in the digital device may be configured in a layered structure, and the fingerprint information of the corresponding user can be detected from a user input applied to the touch sensor. For example, when the user input corresponds to sliding input applied to the touch sensor, the digital device can detect the fingerprint information of the corresponding user from at least one of the start point, the end point and the middle point of the sliding input. If the user input corresponds to touch input of the page change interface, the digital device can detect the fingerprint information of the user from the touch input. According to another embodiment of the present specification, the digital device may detect the fingerprint information of the corresponding user from a user's finger performing gesture input. In this manner, the digital device of the present specification can acquire the fingerprint information of the corresponding user while receiving user input. However, the present specification is not limited thereto and the digital device can collect the fingerprint information of the user through an additional process performed before or after reception of the user input.

According to another embodiment of the present specification, the user input may be received through an external sensor unit connected to the digital device. The external sensor unit can detect the user input including the fingerprint information of the user and transmit a detection result to the digital device. That is, the user input can be detected by the internal sensor unit or external sensor unit of the digital device and transmitted to the digital device.

The digital device determines whether the second display page that will be exchanged with the first display page is in a locked state in response to the user input (S230). The second display page is a target display page that will be changed with the first display page according to the user input. For example, the second display page can be in the vicinity of the first display page in the content sequence and be located in the content page change direction according to the user input. In the embodiments of the present specification, a locked display page may be a display page permitted to be accessed only by a specific user and provided to the user through the display unit only when the user is authenticated. A display page lock state may be set by the user, system setup of the digital device, or security of the content.

When the digital device determines that the second display page is a locked display page in step S230, the digital device extracts the fingerprint information of the corresponding user from the received user input (S240). According to an embodiment of the present specification, the fingerprint information of the user can be acquired with the user input, and the digital device can extract the fingerprint information of the user from the user input and perform user authentication. According to an embodiment of the present specification, acquisition and extraction of the fingerprint information of the user can be selectively performed when the second display page is a locked display page.

Subsequently, the digital device determines whether the user is permitted to access the second display page on the basis of the extracted fingerprint information of the user (S250). For this operation, the digital device compares the extracted fingerprint information with fingerprint information of an authenticated user to check if the extracted fingerprint information corresponds to the fingerprint information of the authenticated user. The authenticated user is a user allowed to access the second display page, and the fingerprint information of the authenticated user can be stored in the digital device or in a server connected to the digital device through a network. According to an embodiment of the present specification, the digital device may change the first display page provided to the display unit to another display page in response to the user input received in step S220. In this case, the first display page may be changed to different display pages depending on the determination result of step S250. That is, the digital device determines whether or not to provide the second display page in a locked state to the user on the basis of the extracted fingerprint information.

If the digital device determines that the user is allowed to access the second display page in step S250, the digital device changes the first display page provided to the display unit to the second display page (S260). The digital device can unlock the lock state of the second display page temporarily or permanently and provide the unlocked second display page to the display unit. Accordingly, the user permitted to access the second display page can directly access the second display page in a locked state through a single user input for page change.

However, if the digital device determines that the user is not permitted to access the second display page, the digital device changes the first display page provided to the display unit to a third display page (S262). In this case, the digital device can skip change to the second display page and change the first display page to the third display page located in the content page change direction in the content sequence. The third display page may be located after the second display page in the content page change direction in the content sequence and may be an initial display page permitted to be accessed. According to an embodiment of the present specification, the third display page may be an initial display page that is not in a locked state and is located after the second display page in the content page change direction in the content sequence. According to another embodiment of the present specification, the third display page may be an initial display page that is located after the second display page in the content page change direction in the content sequence and allowed to be accessed on the basis of the fingerprint information extracted in step S240. According to another embodiment of the present specification, the digital device can provide a fingerprint authentication user interface for receiving a fingerprint input for unlocking the second display page. The fingerprint authentication user interface may be provided through the first display page or provided through an additional display page.

As described above, the digital device can change content pages provided to the display unit according to user input and determine whether to provide a locked display page on the basis of fingerprint information extracted from the user input. According to the embodiments of the present specification, when a locked display page is not permitted to be accessed, the digital device can sequentially provide other display pages in the content sequence to maintain continuity of providing display pages. In the embodiments of the present specification, the page change operation includes various operations such as an operation of turning over pages, a content scrolling operation, etc.

Figure 3:
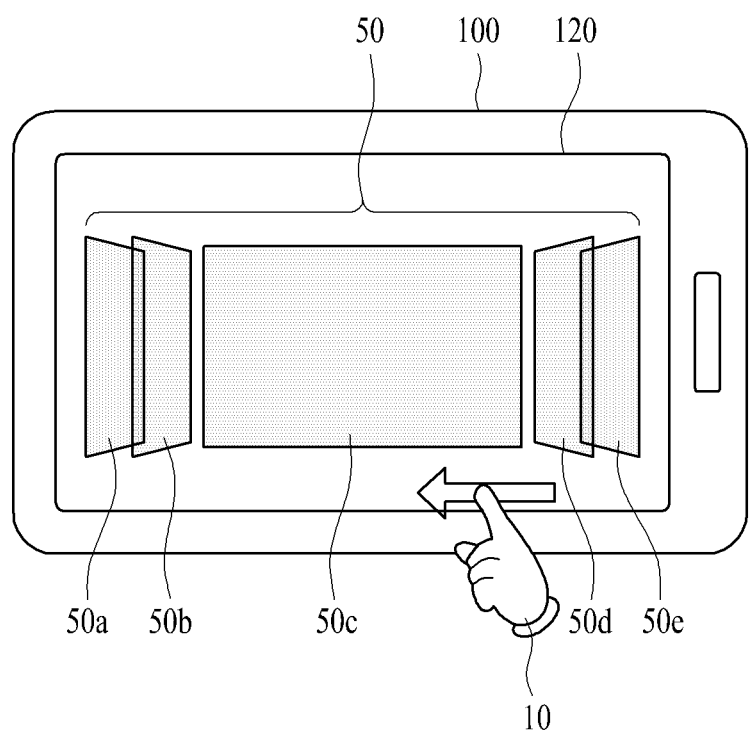
FIG. 3 is a schematic diagram illustrating a digital device, content provided through the digital device and user input for controlling the content according to an embodiment of the present specification.

FIG. 3 shows the digital device 100, content 50 provided to the digital device 100, and user input 10 for controlling the content 50. The digital device 100 may include the display unit 120 and provide the content 50 through the display unit 120. The content 50 may include a plurality of display pages 50a, 50b, 50c, 50d and 50e in a sequence. For example, the content 50 can be a gallery application including a plurality of pictures, a digital document including a plurality of pages, a home screen sequence including a plurality of home screens or the like. However, the present specification is not limited thereto. The digital device 100 can sequentially change the display pages 50a, 50b, 50c, 50d and 50e provided to the display unit 120 in response to the user input 10. FIG. 3 is a schematic diagram of sequential arrangement of the display pages 50a, 50b, 50c, 50d and 50e included in the content 50. The display pages 50a, 50b, 50c, 50d and 50e can be displayed as one screen on the display unit 120. The display pages 50a, 50b, 50c, 50d and 50e can be sub-content of the content 50 of the digital device 100.

The user can control the content 50 using the user input 10 applied to the digital device 100, for example, sliding input. For example, the user can apply the user input 10 of sliding to the left while the display page 50c is displayed on the display unit 120. Then, the digital device 100 receives the user input 10 of sliding to the left and determines a page change direction of the content 50 to the right. Accordingly, the digital device 100 can display the display page 50d, which is located on the right of the display page 50c in the sequence of the content 50, on the display unit 120. The user input 20 may be implemented in various manners in the embodiments of the present specification. In this manner, the digital device 100 can sequentially change and provide the display pages 50a, 50b, 50c, 50d and 50e in response to a plurality of user inputs.

According to an embodiment of the present specification, the digital device 100 can acquire the fingerprint information of the corresponding user from the user input 10. The digital device 100 may include a fingerprint sensor or a fingerprint recognition module for detecting a user fingerprint. The fingerprint sensor may be provided to the display unit 120 or the touch sensor of the digital device 100. The digital device 100 can detect fingerprint information of a user finger performing the user input 10 when the user input 10 is applied to the display unit 120. The digital device 100 compares the detected fingerprint information with previously stored user fingerprint information to determine whether the user is authenticated. According to an embodiment of the present specification, the digital device 100 can determine whether to provide a locked display page on the basis of whether the user is authenticated according to fingerprint recognition.

FIGS. 4 to 10 illustrate a procedure in which the digital device 100 receives user inputs 10 and 12 and changes display pages according to embodiments of the present specification. In FIGS. 4 to 10, the digital device 100 receives user sliding inputs as the user inputs 10 and 12. However, the user inputs 10 and 12 are not limited to the sliding input and can be modified in various ways.

Figure 4:
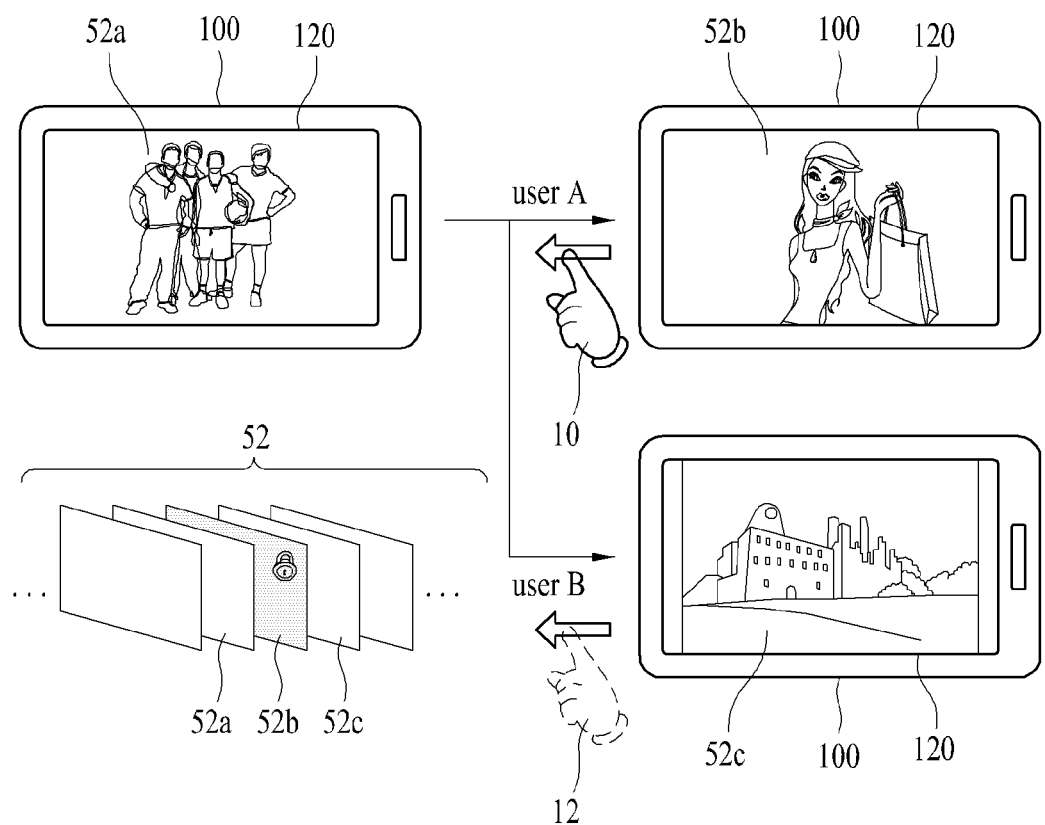
FIGS. 4 to 8 illustrate an embodiment in which the digital device according to the present specification receives a user input and changes a display page.

Referring to FIG. 4, a plurality of display pages may include a plurality of pictures 52a, 52b and 52c. The plurality of pictures 52a, 52b and 52c form content 52 in a sequence. In FIG. 4, the pictures 52a and 52c are public content permitted to be accessed by all users and the picture 52b is private content permitted to be accessed only by user A. The plurality of pictures 52a, 52b and 52c form the sequence 52 in the order of 52a, 52b and 52c.

In FIG. 4, the digital device 100 can receive the user input 10 of user A or the user input 12 of user B, which corresponds to sliding to the left, while the picture 52a is displayed on the display unit 120. The digital device 100 changes the picture 52a of the content 52, currently displayed on the display unit 120, to the picture 52b on the right of the picture 52a in the content sequence according to the user input 10 or 12. Here, the digital device 100 extracts fingerprint information of the corresponding user from the received user input 10 or 12.

The digital device 100 determines whether the corresponding user is permitted to access the picture 52b on the basis of the extracted fingerprint information. To perform this operation, the digital device 100 may compare the fingerprint information extracted from the user input 10 or 12 with previously stored user fingerprint information. If the extracted fingerprint information is matched with the previously stored fingerprint information of user A (or if a predetermined matching rate is satisfied), the digital device 100 determines that the corresponding user is permitted to access the picture 52b in a locked state. Accordingly, the digital device 100 provides the picture 52b on the right of the picture 52a to the display unit 120. However, if the extracted fingerprint information is not matched with the previously stored fingerprint information of user A (or if the predetermined matching rate is not satisfied), the digital device 100 determines that the corresponding user is not allowed to access the picture 52b in a locked state. Accordingly, the digital device 100 skips change to the picture 52b and provides the picture 52c located on the right of the picture 52b to the display unit 120.

In this manner, the digital device 100 can provide the picture 52b in a locked state to the display unit 120 when authenticated user A performs the user input 10. However, when user B who is not authenticated performs the user input 12, the digital device 100 can skip the picture 52b in a locked state and provide the picture 52c to the display unit 120. In this case, the picture 52c is located on the right of the picture 52b (that is, located in the page change direction) and corresponds to an initial picture permitted to be accessed.

Figure 5:
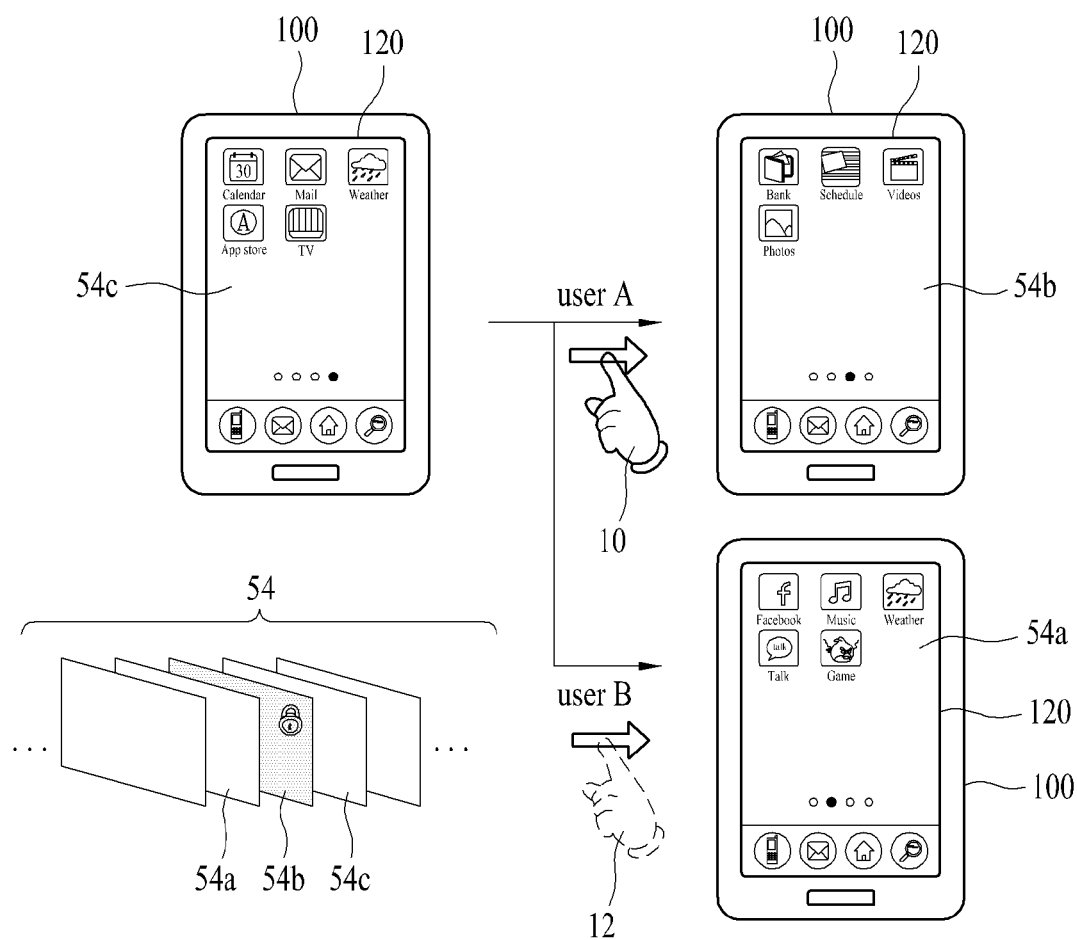

Referring to FIG. 5, a plurality of display pages may include a plurality of home screens 54a, 54b and 54c. The plurality of home screens 54a, 54b and 54c form content 54 in a sequence. Each of the home screens 54a, 54b and 54c includes at least one icon by which an application is executed. In FIG. 5, the home screens 54a and 54c are public content permitted to be accessed by all users and the home screen 54b is private content permitted to be accessed only by user A. Accordingly, user A can use at least one application icon included in the home screen 54b. The plurality of home screens 54a, 54b and 54c form the content sequence in the order of 54a, 54b and 54c. In the embodiment of FIG. 5, detailed description of part of the embodiment of the FIG. 5, which is identical to the corresponding part of the embodiment of FIG. 4, is omitted.

In FIG. 5, the digital device 100 can receive the user input 10 of user A or the user input 12 of user B, which corresponds to sliding to the right, while the home screen 54c is displayed on the display unit 120. The digital device 100 changes the home screen 54c of the content 54, currently displayed on the display unit 120, to the home screen 54b on the left of the home sequence 54c in the content sequence according to the user input 10 or 12. The digital device 100 extracts fingerprint information of the corresponding user from the received user input 10 or 12 and determines whether the corresponding user is allowed to access the home screen 54b on the basis of the extracted fingerprint information. If the corresponding user is a permitted user, the digital device 100 provides the home screen 54b located on the left of the home screen 54c to the display unit 120. If the corresponding user is not a permitted user, however, the digital device 100 skips change to the home screen 54b and provides the home screen 54a located on the left of the home screen 54b to the display unit 120.

In this manner, the digital device 100 can provide the home screen 54b in a locked state to the display unit 120 when authenticated user A performs the user input 10. Accordingly, user A can select an icon displayed on the home screen 54b to execute an application corresponding to the icon. When user B who is not authenticated performs the user input 12, however, the digital device 100 can skip the home screen 54b in a locked state and provide the home screen 54a to the display unit 120. Here, the home screen 54a is located on the left of the home screen 54b in the content sequence (that is, located in the page change direction) and corresponds to an initial home screen permitted to be accessed.

Figure 6:
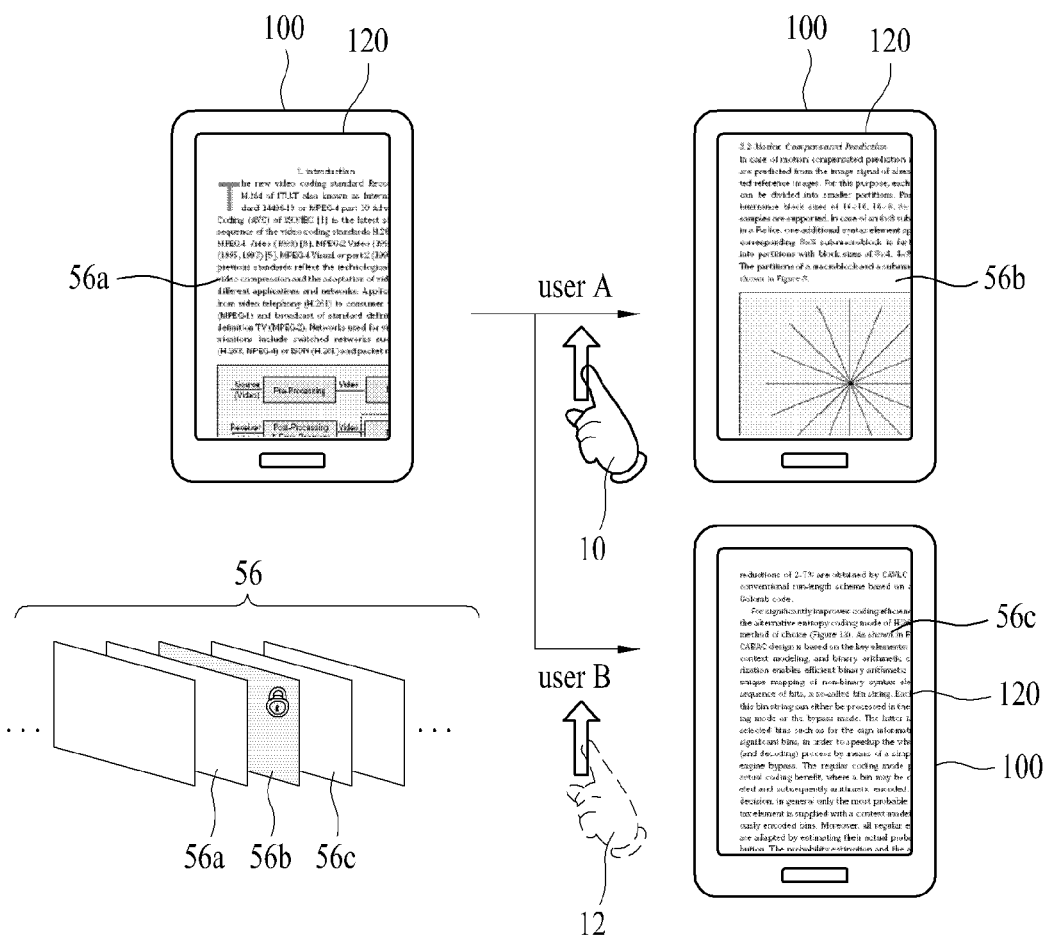

Referring to FIG. 6, a plurality of display pages may include a plurality of pages 56a, 56b and 56c of a digital document. The plurality of pages 56a, 56b and 56c of the digital document form content 56 in a sequence. In FIG. 6, the pages 56a and 56c are public content permitted to be accessed by all users and the page 56b is private content permitted to be accessed only by user A. The plurality of pages 56a, 56b and 56c form the sequence in the order of 56a, 56b and 56c. In the embodiment of FIG. 6, detailed description of part of the embodiment of FIG. 6, which is identical to the corresponding part of the embodiment of FIG. 4, is omitted.

In FIG. 6, the digital device 100 can receive the user input 10 of user A or the user input 12 of user B, which corresponds to sliding upward, while the page 56a is displayed on the display unit 120. The digital device 100 changes the page 56a of the content 56, currently displayed on the display unit 120, to the page 56b following the page 56a in the content sequence according to the user input 10 or 12. The digital device 100 extracts fingerprint information of the corresponding user from the received user input 10 or 12 and determines whether the corresponding user is permitted to access the page 56b on the basis of the extracted fingerprint information. If the corresponding user is a permitted user, the digital device 100 provides the page 56b following the page 56a to the display unit 120. If the corresponding user is not a permitted user, however, the digital device 100 skips change to the page 56b and provides the page 56c following the page 56b to the display unit 120. Here, the page 56c follows the page 56b in the sequence (that is, is located in the page change direction) and corresponds to an initial page permitted to be accessed. In the embodiment of FIG. 6, page change can be performed according to an operation of turning over pages, an operation of scrolling through the content 56, etc.

Figure 7:
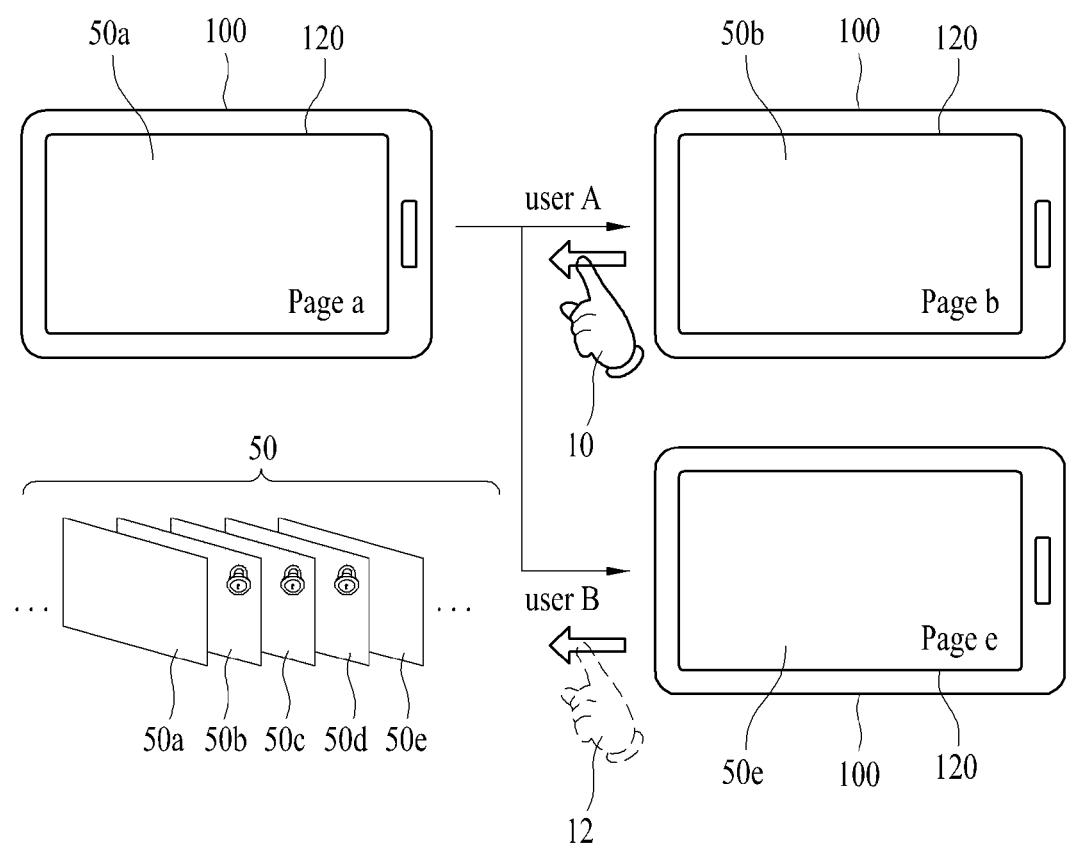

FIG. 7 illustrates another embodiment of the present specification. In FIG. 7, content 50 includes a plurality of displays pages 50a, 50b, 50c, 50d and 50e in a sequence. The display pages 50a and 50e are public content permitted to be accessed by all users, whereas the display pages 50b, 50c and 50d are private content permitted to be accessed only by user A. That is, consecutive display pages 50b, 50c and 50d are allowed to be accessed by the specific user.

In the embodiment of FIG. 7, the digital device 100 can receive the user input 10 of user A or the user input 12 of user B, which corresponds to sliding to the left, while the display page 50a is displayed on the display unit 120. The digital device 100 changes the display page 50a of the content 50, currently displayed on the display unit 120, to the display page 50b on the right of the display page 50a in the content sequence according to the user input 10 or 12. The digital device 100 extracts fingerprint information of the corresponding user from the received user input 10 or 12 and determines whether the corresponding user is allowed to access the display page 50b on the basis of the extracted fingerprint information. If the corresponding user is a permitted user, the digital device 100 provides the display page 50b located on the right of the display page 50a to the display unit 120. If the corresponding user is not a permitted user, however, the digital device 100 skips change to the display pages 50b, 50c and 50d and provides the display page 50e located on the right of the display page 50d to the display unit 120. The display pages 50c and 50d are permitted to be accessed only by user A like the display page b, and thus the digital device 100 can skip the display pages 50c and 50d with the display page 50b.

In this manner, the digital device 100 can sequentially provide the display pages 50b, 50c and 50d in a locked state to the display unit 120 when authenticated user A performs the user input 10. That is, when user A consecutively performs the user input 10 of sliding to the left in the embodiment of FIG. 7, the digital device 100 can change the display pages of the content 50 to the right in the sequence, such as 50a→50b→50c→50d→50e. If user B who is not authenticated performs the user input 12, however, the digital device 100 can skip display pages 50b, 50c and 50d in a locked state and provide the display page 50e to the display unit 120 in response to the user input 12. The display page 50e is located on the right of the display page 50b (that is, located in the page change direction) and corresponds to an initial display page permitted to be accessed.

Figure 8:
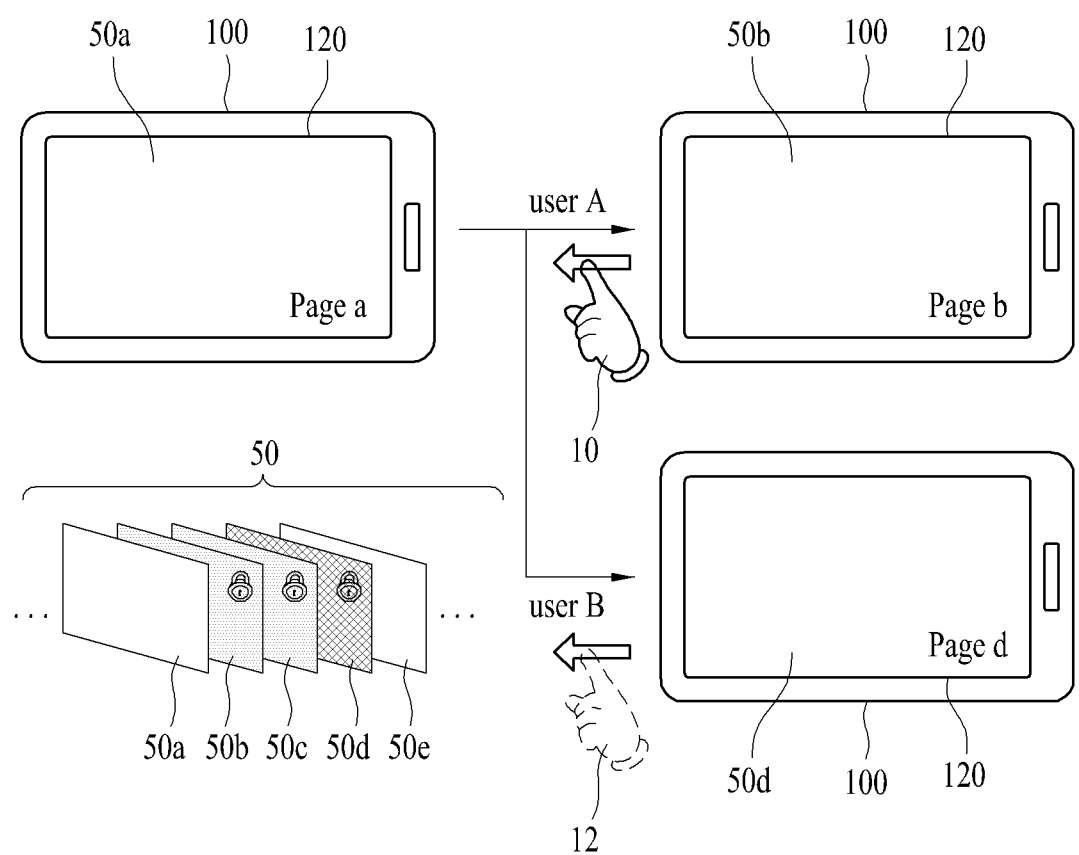

FIG. 8 illustrates another embodiment of the present specification. In FIG. 8, content 50 includes a plurality of displays pages 50a, 50b, 50c, 50d and 50e in a sequence. The display pages 50a and 50e are public content permitted to be accessed by all users, the display pages 50b and 50c are private content permitted to be accessed only by user A, and the display page 52d is private content permitted to be accessed only by user B. That is, the content 50 of the digital device 100 can include display pages permitted to be accessed by a plurality of users. The digital device 100 can store fingerprint information of the plurality of users and identify a user corresponding to a user input through fingerprint information extracted from the user input. Detailed description of part of the embodiment of FIG. 8, which is identical to the corresponding part of the embodiment of FIG. 7, is omitted.

In the embodiment of FIG. 8, the digital device 100 can receive the user input 10 of user A or the user input 12 of user B, which corresponds to sliding to the left, while the display page 50a is displayed on the display unit 120. The digital device 100 extracts fingerprint information of the corresponding user from the received user input 10 or 12 and determines whether the corresponding user is allowed to access the display page 50b on the basis of the extracted fingerprint information. If the corresponding user is a permitted user, the digital device 100 provides the display page 50b located on the right of the display page 50a to the display unit 120. If the corresponding user is not a permitted user, however, the digital device 100 skips change to the display pages 50b and 50c and checks whether the corresponding user is permitted to access the display page 50d. Since the display page 50c is permitted to be accessed only by user A like the display page 50b, the digital device 100 can skip the display page 50c with the display page 50b. If the corresponding user is a permitted user, the digital device 100 provides the display page 50d to the display unit 120. If the corresponding user is not a permitted user, the digital device 100 skips change to the display page 50d and provides the display page 50e to the display unit 120.

In this manner, the digital device 100 can provide different display pages to a plurality of users when the content 50 includes display pages locked for the plurality of users. That is, when user A consecutively performs user input 10 of sliding to the left in the embodiment of FIG. 8, the digital device 100 can change the display pages of the content 50 to the right in a sequence such as 50a→50b→50c→50e. Here, the digital device 100 can skip change to the display page 50e permitted to be accessed by user B. When user B consecutively performs user input 12 of sliding to the left, the digital device 100 can change the display pages of the content 50 to the right in a sequence such as 50a→50d→50e. Here, the digital device 100 can skip change to the display pages 50b and 50c permitted to be accessed by user A. The display page 50d is located on the right of the display page 50b (that is, is located in the page change direction) in the sequence and corresponds to an initial display page permitted to be accessed on the basis of fingerprint information of user B.

Figure 9:
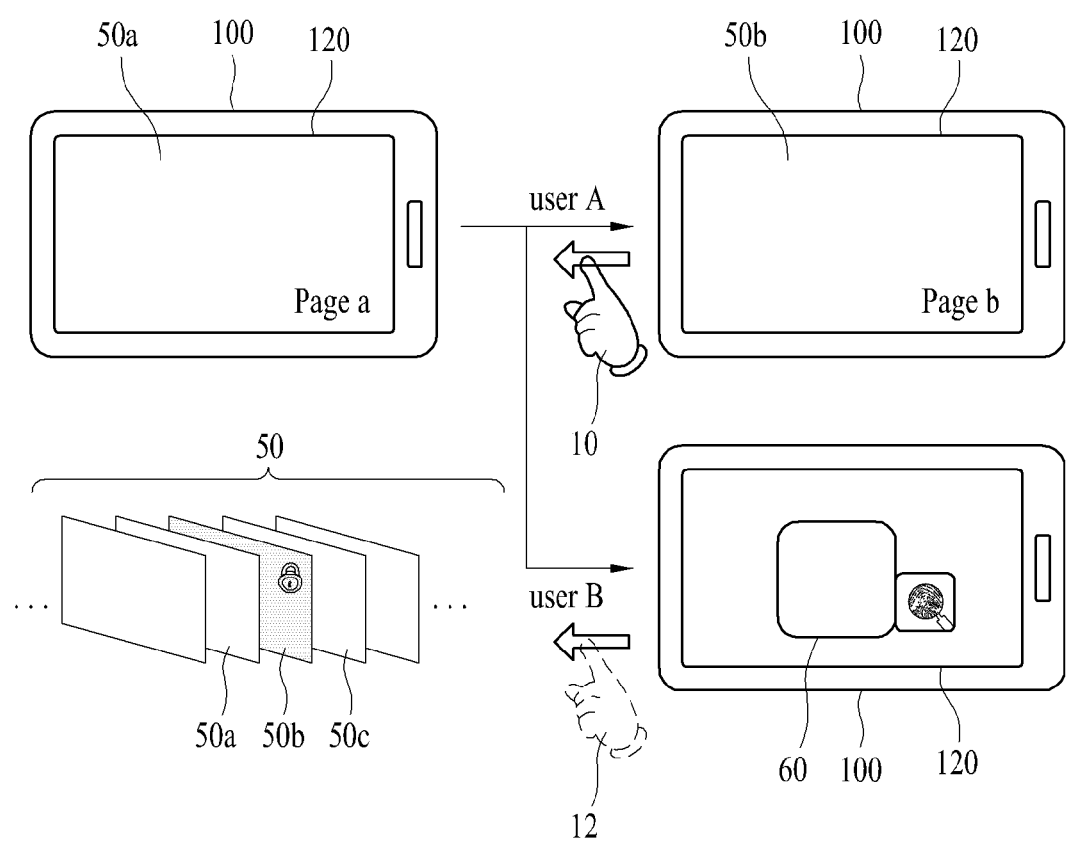
FIG. 9 illustrates a method of providing a fingerprint authentication user interface according to an embodiment of the present specification.

FIG. 9 illustrates another embodiment of the present specification. In FIG. 9, display pages 50a and 50c are public content permitted to be accessed by all users and the display page 50b is private content permitted to be accessed only by user A. The display pages 50a, 50b and 50c form a sequence in the order of 50a, 50b and 50c.

In the embodiment of FIG. 9, the digital device 100 can provide a fingerprint authentication user interface 60 when the display page 50b, which will be changed with the display page 50a currently displayed on the display unit 120, is locked and is not permitted to be accessed. Access to the display page 50b may not be permitted when user B who is not an allowed user performs the user input 12. In addition, access to the display page 50b may not be permitted when fingerprint information of user A is not successfully acquired from the user input 10 although allowed user A performs the user input 10.

According to an embodiment of the present specification, the digital device 100 can provide the fingerprint authentication user interface 60 for receiving a fingerprint input for unlocking the display page 50b. The digital device 100 outputs the fingerprint authentication user interface 60 to the display unit 120 to induce the user to input his/her fingerprint to the digital device 100. According to an embodiment of the present specification, the digital device 100 can display the fingerprint authentication user interface 60 on the display page 50a without performing change to the display page 50a. According to another embodiment of the present specification, the digital device 100 can change the display page displayed on the display unit 120 to a new display page and display the fingerprint authentication user interface 60 on the new display page. The digital device 100 performs display page change on the basis of newly input user fingerprint information. If access to the display page 50b is permitted on the basis of the newly input fingerprint information, the digital device 100 displays the display page 50b on the display unit 120.

Figure 10:
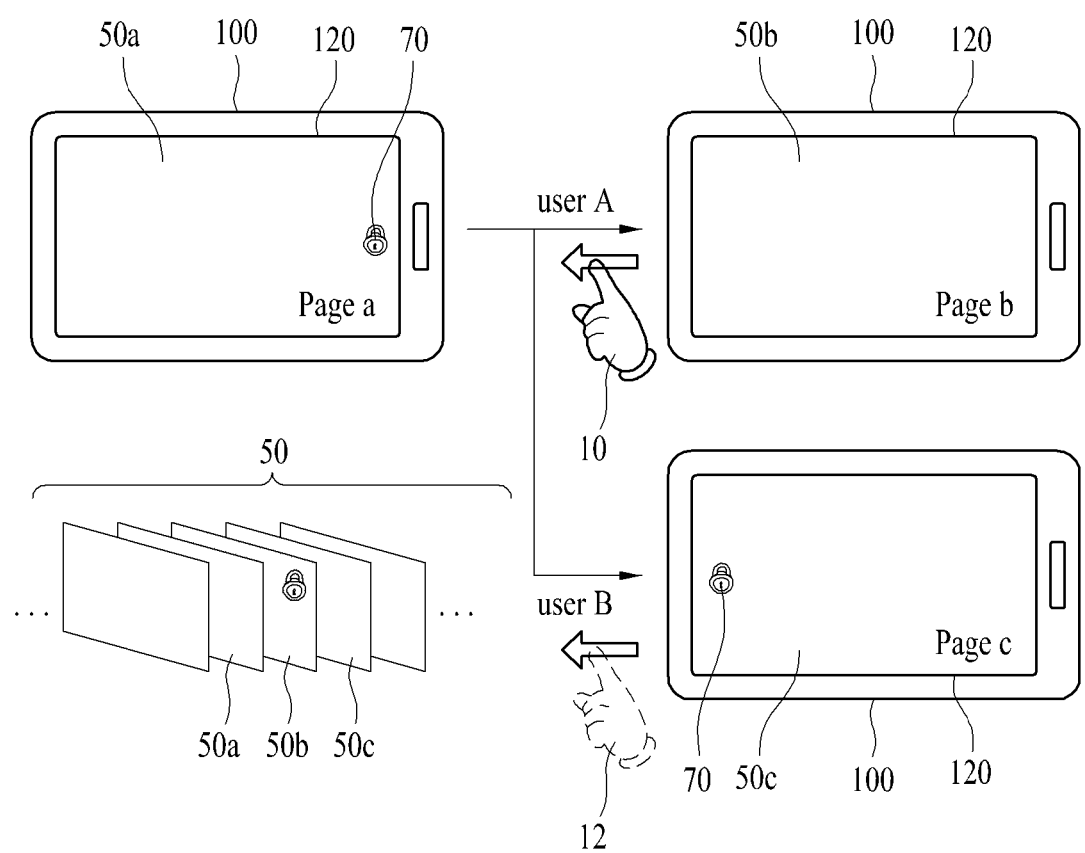
FIG. 10 illustrates a method of providing a lock page indicator according to an embodiment of the present specification.

FIG. 10 illustrates an operation of the digital device 100 to provide a lock page indicator 70 that indicates a relative position of a locked display page according to an embodiment of the present specification.

According to the present embodiment, the digital device 100 can indicate the relative position of the display page 50b in a locked state in the sequence through the lock page indicator 70. For example, the digital device 100 can provide the lock page indicator 70 to indicate that the display page 50b in the vicinity of the display page 50a is locked while the display page 50a is displayed on the display unit 120. The lock page indicator 70 can represent information about the position of the locked display page 50b in the sequence on the basis of the display page 50a currently displayed on the display unit 120. For example, when the locked display page 50b is located on the right of the display page 50a, as shown in FIG. 10, the digital device 100 can display the lock page indicator 70 corresponding to the display page 50b at the right side of the display unit 120.

If user A who is allowed to access the display page 50b performs user input 10 while the display page 50a is displayed on the display unit 120, the digital device 100 change the display page 50a to the display page 50b. However, when user B who is not allowed to access the display page 50b performs the user input 12, the digital device 100 can skip change to the display page 50b and change the display page 50a to the display page 50c. Here, the digital device 100 can display the lock page indicator 70 corresponding to the display page 50a at the left side of the display unit 120 to indicate that the locked display page 50b is located on the left of the display page 50c in the sequence. The digital device 100 can selectively provide the lock page indicator 70 according to an embodiment of the present specification.

Figure 11:
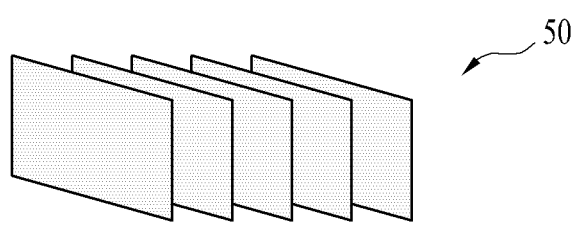
FIG. 11 shows arrangements of a content sequence according to an embodiment of the present specification.
Figure 11:
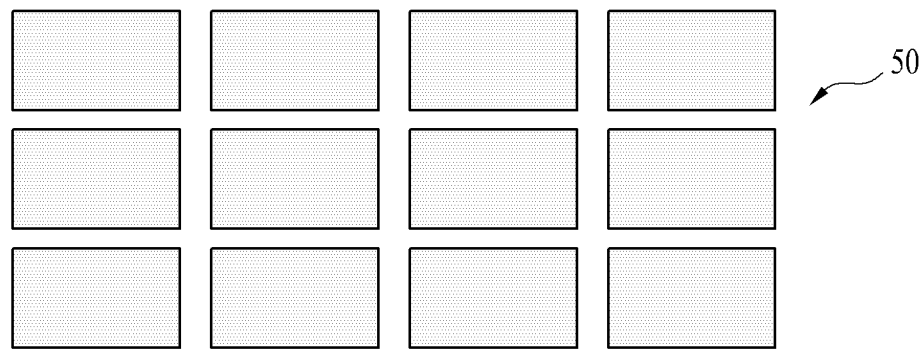
Figure 11:
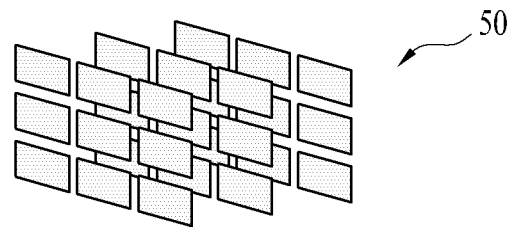

FIG. 11 shows sequence arrangement of the content 50 according to an embodiment of the present specification. As described above, the sequence arrangement of the content 50 includes at least one of one-dimensional arrangement (FIG. 11(a)), two-dimensional arrangement (FIG. 11(b)) and three-dimensional arrangement (FIG. 11(c)). If the content 50 corresponds to a sequence in one-dimensional arrangement as shown in FIG. 11(a), display pages included in the content 50 other than the current display page may exist before and/or after (or on the left and/or right of) the current display page. Here, the digital device can determine a one-dimensional page change direction (e.g., horizontal direction or vertical direction) on the basis of a received user input and change pages of the content 50 in the determined page change direction.

When the content 50 corresponds to a sequence in two-dimensional arrangement, as shown in FIG. 11(b), display pages included in the content 50 other than the current display page may exist in at least one of directions corresponding to the top, bottom, left, right and combinations thereof of the current display page. Here, the digital device can determine a two-dimensional page change direction (e.g., horizontal direction, vertical direction or a combination thereof) on the basis of a received user input and change pages of the content 50 in the determined page change direction.

When the content 50 corresponds to a sequence in three-dimensional arrangement, as shown in FIG. 11(c), display pages included in the content 50 other than the current display page may exist in at least one of directions corresponding to the front, back, top, bottom, left, right and combinations thereof of the current display page. Here, the digital device can determine a three-dimensional page change direction (e.g., front-and-back direction, left-and-right direction, up-and-down direction or a combination thereof) on the basis of a received user input and change pages of the content 50 in the determined page change direction. The aforementioned page change directions are arbitrary directions for describing the sequence arrangement and page change direction of the present specification and can be modified in various ways.

Figure 12:
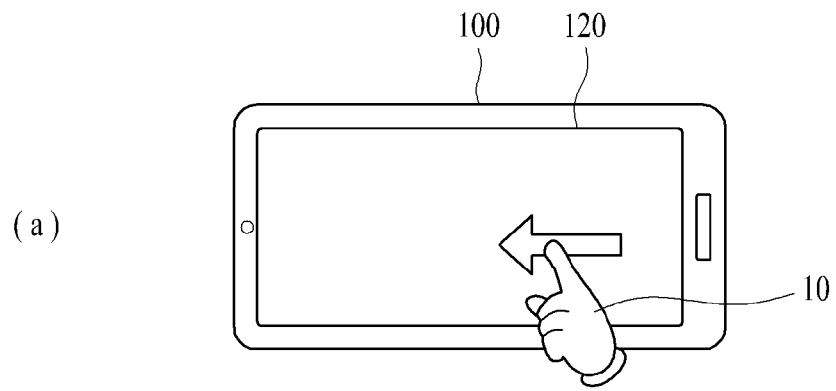
FIG. 12 illustrates user input according to an embodiment of the present specification.
Figure 12:
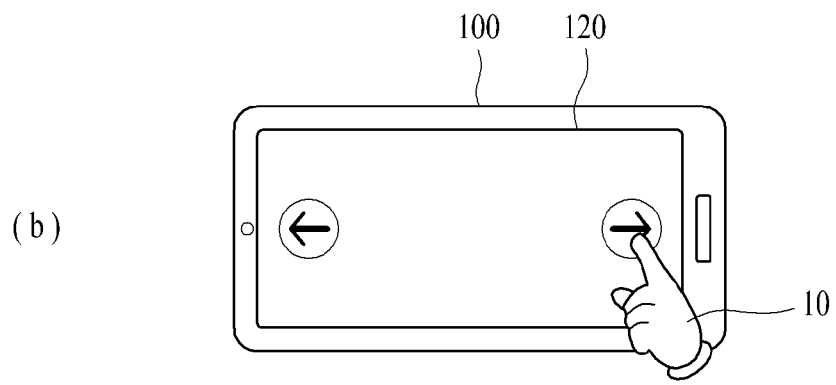
Figure 12:
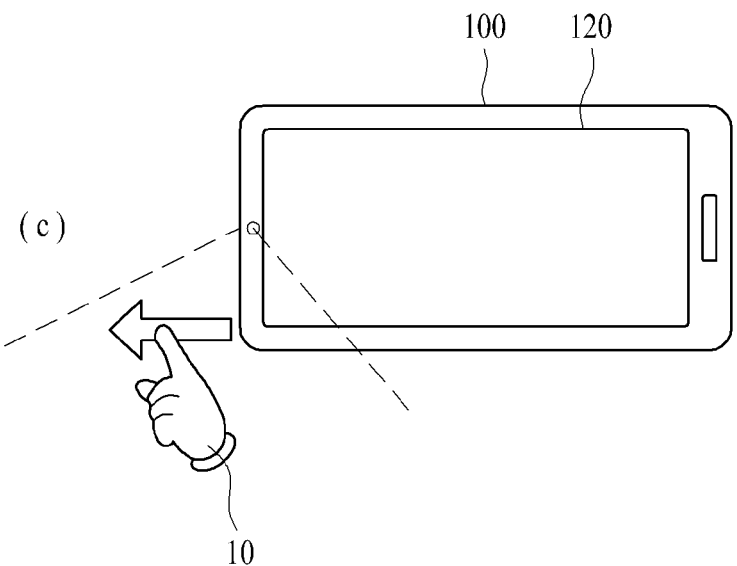

FIG. 12 illustrates various embodiments of the user input 10. The user input 10 includes various inputs such as a sliding input (FIG. 12(a)), a touch input of a page change interface (FIG. 12(b)) and a gesture input (FIG. 12(c)).

Referring to FIG. 12(a), the user input 10 may include a sliding input applied to the digital device 100. The digital device 100 can determine a display page change direction corresponding to the sliding input of the user. For example, the digital device 100 can reverse the sliding direction of the sliding input and use the reversed sliding direction as the display page change direction. That is, when the user input 10 of sliding to the left is received as shown in FIG. 12(a), the digital device 100 can change the current display page to the display page located on the right of the current display page. Otherwise, the digital device 100 can change the current display page to the next display page in response to an upward sliding input and change the current display page to a previous display page in response to a downward sliding input. If the content of the digital device 100 has two-dimensional or three-dimensional sequence arrangement, the sliding direction of the user input may be subdivided and respectively correspond to sequence arrangement change directions.

Referring to FIG. 12(b), the user input 10 may include a touch input of the page change interface provided to the digital device 100. The page change interface may be a user interface provided to the display unit 120 or a keypad for direction change of the digital device 100. The digital device 100 can perform display page change on the basis of a predetermined direction of the page change interface, touched by the user.

Referring to FIG. 12(*c*), the user input 10 may include a gesture input applied to the digital device 100. In this case, the digital device 100 may include an additional sensor for detecting the gesture input. A page change method performed by the digital device 100 according to the gesture input corresponds to the page change method described in FIG. 12(*a*).

According to the embodiments of the present specification, the digital device 100 can extract fingerprint information of a user from the user input 10 in various forms. If the user input 10 is a direct touch input applied to the digital device 100, as shown in FIG. 12(*a*) or FIG. 12(*b*), the digital device 100 can extract fingerprint information from the user input 10 using a fingerprint sensor provided with a touch sensor to the display device 100. If the user input 10 is not a direct touch applied to the digital device 100, the digital device 100 can extract fingerprint information of a user finger performing the user input 10 through noncontact fingerprint recognition. For example, the digital device 100 can detect the image of the user finger performing the user input 10 and analyze the image to extract fingerprint information of a user. Alternatively, the digital device 100 can detect protrusions and depressions of the surface of the user finger performing the user input 10 using an optical sensor and acquire fingerprint information of the user using the detected protrusions and depressions on the surface of the user finger.

Figure 13:
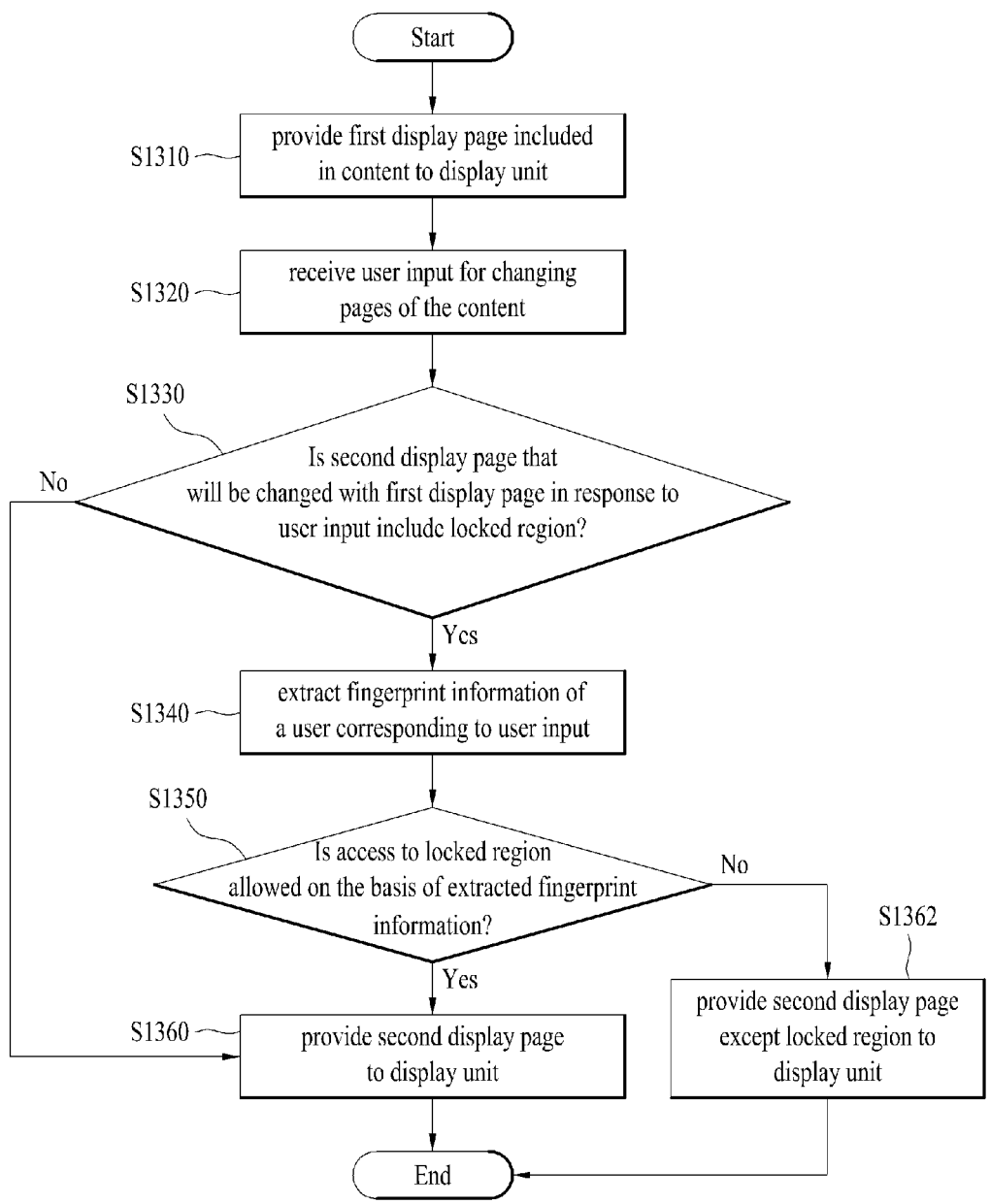
FIG. 13 is a flowchart illustrating a method for controlling content according to another embodiment of the present specification.

FIG. 13 is a flowchart illustrating a method for controlling content according to another embodiment of the present specification. Detailed description of part of the embodiment of FIG. 13, which is identical to the corresponding part of the embodiment of FIG. 2, is omitted.

In the embodiment of FIG. 13, a second display page that will be exchanged with a first display page according to a user input includes a locked region. That is, at least part of the second display page is locked, which is permitted to be accessed only by a specific user. The locked region can be provided to the display unit only once a user is authenticated.

Accordingly, the digital device determines whether the second display page that will be exchanged with the first display page includes a locked region in response to a user input (S1330). If the second display page includes the locked region, the digital device extracts fingerprint information of a corresponding user from the received user input (S1340). The fingerprint information of the user can be acquired at the same time as the user input and the digital device can extract the fingerprint information of the user from the user input and perform user authentication.

Subsequently, the digital device determines whether the locked region is permitted to be accessed on the basis of the extracted fingerprint information (S1350). If the digital device determines that the locked region is permitted to be accessed, the digital device provides the second display page including the locked region to the display unit (S1360). The digital device can unlock the locked region temporarily or permanently and provide the unlocked region to the display unit.

However, if the digital device determines that the locked region is not permitted to be accessed, the digital device provides the second display page other than the locked region to the display unit (S1362). The digital device may process the corresponding region of the second display page as a blind region or display the part of the second display page other than the locked region such that the locked region is not displayed.

According to the embodiment of FIG. 13, when part of a display page is locked, the digital device can determine whether to display the locked part on the basis of the fingerprint information of the user who performs user input. According to the embodiments of the present specification, display page change may include an operation of turning over display pages. Here, the digital device can change a plurality of display pages page by page. According to an embodiment of the present specification, display page change may include an operation of scrolling through content. Here, the digital device can scroll through a plurality of display pages displayed on the display unit horizontally or vertically.

Figure 14:
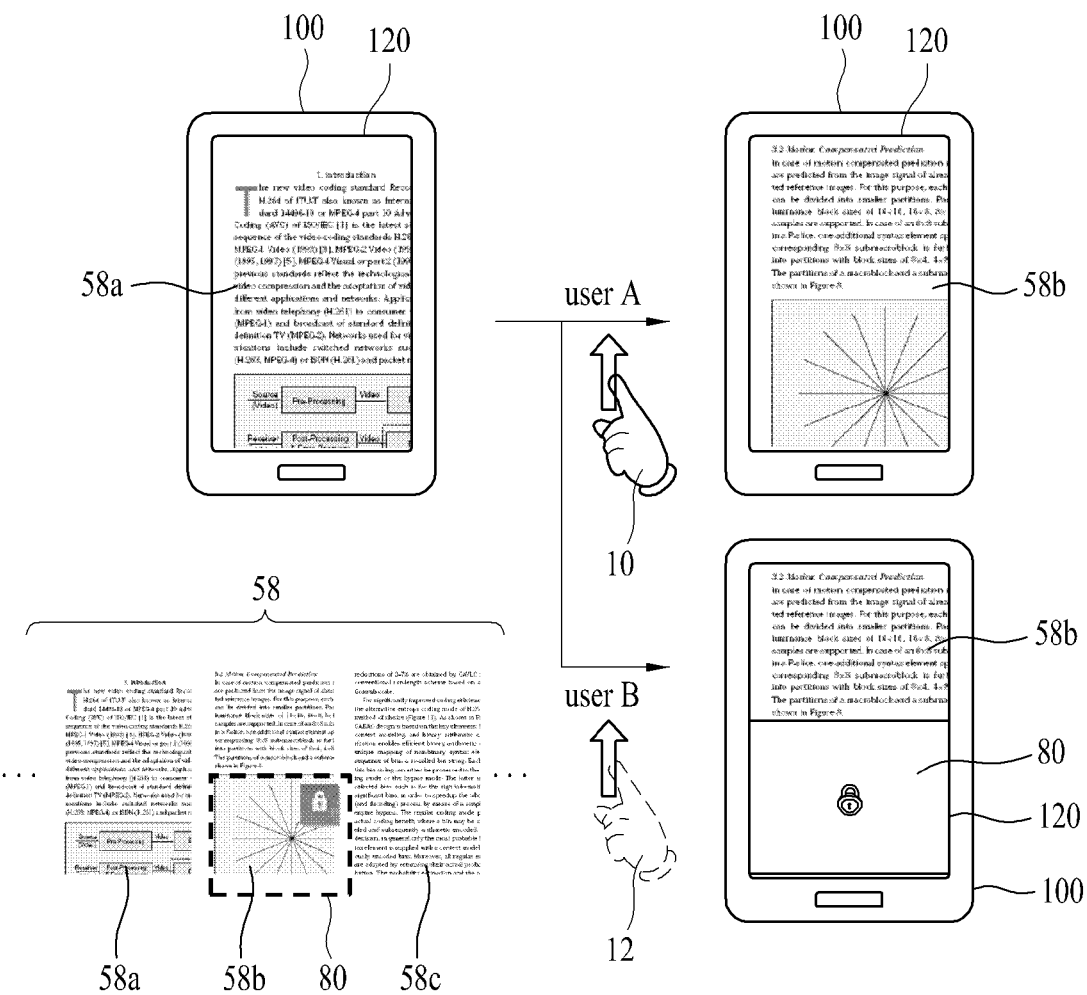
FIG. 14 illustrates a method by which the digital device changes display pages according to the embodiment shown in FIG. 13.

FIG. 14 illustrates a method by which the digital device 100 changes display pages according to the embodiment of FIG. 13. In FIG. 14, a plurality of display pages includes a plurality pages 58*a*, 58*b* and 58*c* of a digital document that form content 58 in a sequence. The pages 58*a* and 58*c* correspond to public content allowed to be accessed by all users, whereas the page 58*b* is private content permitted to be accessed only by user A. Detailed description of part of the embodiment of FIG. 14, which is identical to the corresponding part of the embodiment of FIG. 6, is omitted.

In FIG. 14, the digital device 100 can receive user input 10 of user A or user input 12 of user B, which corresponds to sliding upward, while the page 58*a* is displayed on the display unit 120. The digital device 100 changes the page 58*a* of the content 58, currently displayed on the display unit, to the next page 58*b* in the sequence in response to the user input 10 or 12. Here, the page 58*b* includes a locked part 80.

The digital device 100 extracts fingerprint information of a user from the user input 10 or 12 and determines whether the user is allowed to access the locked part 80 on the basis of the extracted fingerprint information. If user A who is allowed to access the locked part 80 performs the user input 10, the digital device 100 provides the page 58*b* including the locked part 80 to the display unit 120. If user B who is not permitted to access the locked part 80 performs the user input 12, the digital device 100 provides the remaining part of the page 58*b* other than the locked part 80 to the display unit 120. The digital device 100 can process the locked part 80 of the page 58*b* as a blind part in order not to display the locked part, as shown in FIG. 14. Otherwise, the digital device 100 can display only the remaining part of the page 58*b* other than the locked part 80.

Figure 15:
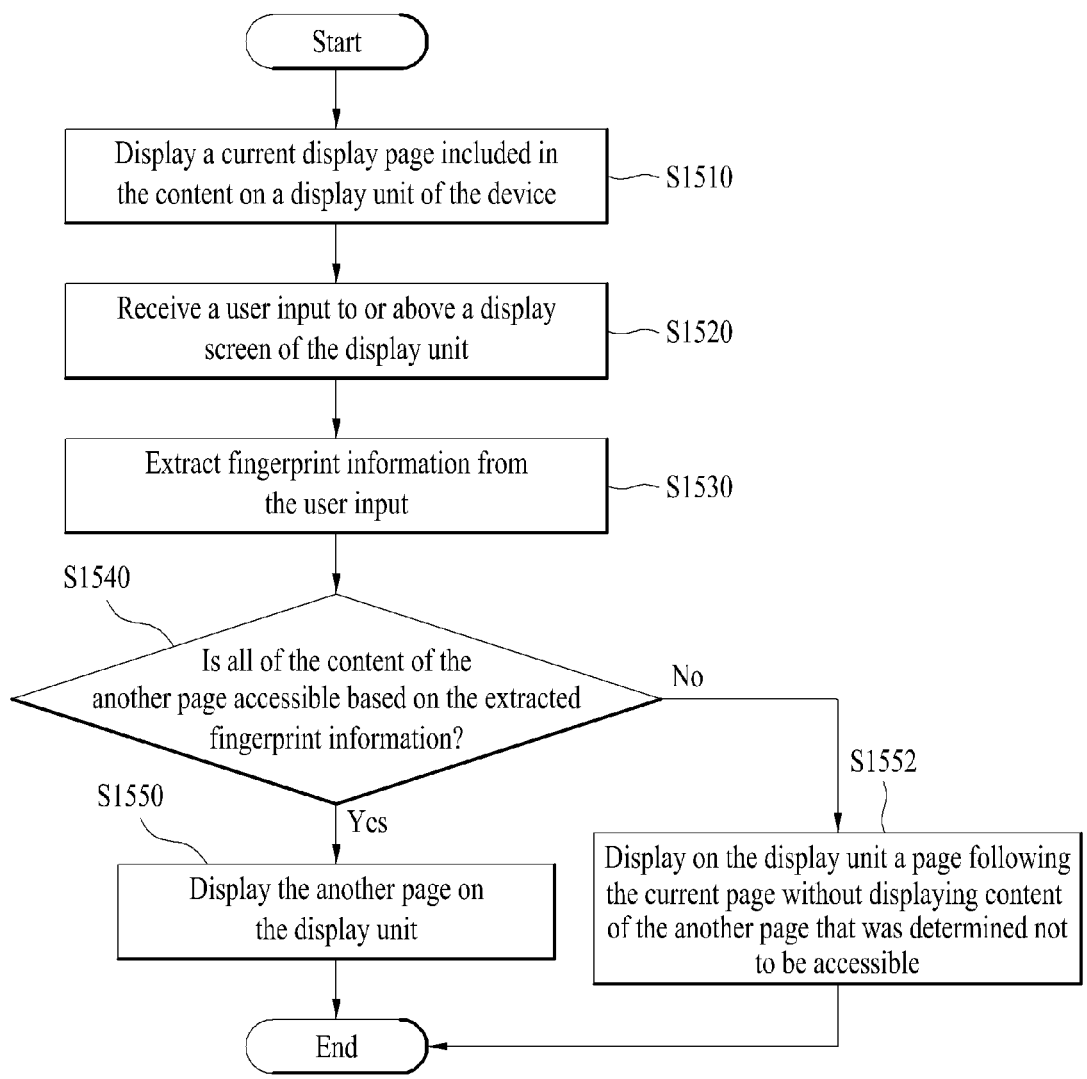
FIG. 15 is a flowchart illustrating a method for controlling content according to another embodiment of the present specification.

FIG. 15 is a flowchart illustrating a method for controlling content according to another embodiment of the present specification. Each step of the method shown in FIG. 15 may be performed by the digital device according to the present specification. That is, the processor 110 of the digital device 100 can control each step of FIG. 15 on the basis of control commands of the content control module 200 of the digital device 100 shown in FIG. 1.

First of all, the digital device according to the present specification may display a current display page included in the content on a display unit of the device (S1510). Herein, the content may include a plurality of display pages in a sequence. For example, the plurality of display pages may include at least one of a plurality of pictures, a plurality of home screens, and a plurality of pages of a digital document.

Next, the digital device according to the present specification may receive a user input to or above a display screen of the display unit for changing from the current display page to another page of the content (S1520). For example, the user input may include a sliding touch input to or above the current display pate. Also, for example, the user input may include a touch-and-hold input to or above the current display page. Also, as described in FIG. 2, the user input can include various user inputs, such as gesture input, complex touch gesture input, etc.

Next, the digital device according to the present specification may extract fingerprint information from the user input (S1530). For example, the digital device may extract the fingerprint information at every user input for changing the pages. Also, for example, the digital device may extract the fingerprint information from a touch only when a following page includes locked content.

Next, the digital device according to the present specification may determine whether the content of the other page is or is not accessible based on the extracted fingerprint information (S1540). For example, the digital device may display an icon in place of any content determined not to be accessible based on the extracted fingerprint information. Herein, the icon may indicate that the content is not accessible. If all of the content of the other page is determined to be accessible based on the extracted fingerprint information in step S1540, the digital device may display the other page on the display unit (S1550). In an embodiment, the digital device may display a turning of the current page to the other page. In another embodiment, the digital device may display a sliding of the current page to reveal the other page. In another embodiment, the digital device may display a flash removal of the current page to reveal the other page. In another embodiment, the digital device may scroll from the current page to the other page.

However, if any of the content of the another page is determined to be accessible based on the extracted fingerprint information in step S1540, the digital device may display on the display unit a page following the current page without displaying content of the another page that was determined not to be accessible (S1552). For example, the page following the current page may include a page of the sequence following the other page. Also, for example, the page following the current page may include the another page with the content that was determined not to be accessible replaced with an icon, image or other data indicating that the content is not accessible. Also, for example, the page following the current page may include the other page without displaying any indication of the existence of the content that was determined not to be accessible.

According to an embodiment of the present specification, if any of the content of the another page is determined not to be accessible based on the extracted fingerprint information, and if the current page is a next-to-last page corresponding to a change direction of the user input, the digital device may not change the display from the current page. According to another embodiment of the present specification, the digital device may provide a fingerprint authentication user interface for receiving a second fingerprint input for unlocking any of the content of the another page that is determined not to be accessible based on the extracted fingerprint information.

Meanwhile, according to an embodiment of the present specification, if any of the content of the another page is determined not to be accessible based on the extracted fingerprint information, prior to displaying the pate following the current page without displaying content of the another page that was determined not to be accessible, following steps can be performed. First of all, the digital device may provide a fingerprint authentication user interface for receiving a second user input. Next, the digital device may extract second fingerprint information from the second fingerprint information. Next, the digital device may determine whether the content of the other page is or is not accessible based on the extracted second fingerprint information. If all of the content of the other page is determined to be accessible based on the extracted second fingerprint information, the digital device may display the other page on the display unit. However, if any of the content of the another page is determined not to be accessible based on the extracted second fingerprint information, the digital device may display on the display unit the page following the current page without displaying content of the another page that was determined not to be accessible.

According to another embodiment of the present specification, if any of the content of the another page is determined not to be accessible based on the extracted fingerprint information, prior to displaying the pate following the current page without displaying content of the another page that was determined not to be accessible, following steps can be performed. First of all, the digital device may provide an authentication user interface for receiving a second user input. Next, the digital device may determine whether the content of the other page is or is not accessible based on the second user input. If all of the content of the other page is determined to be accessible based on the second user input, the digital device may display the other page on the display unit. However, if any of the content of the another page is determined not to be accessible based on the second user input, the digital device display on the display unit the page following the current page without displaying content of the another page that was determined not to be accessible.

The fingerprint authentication methods discussed above may be augmented to account for errors in fingerprint extraction or other issues. For example, if a first fingerprint is not determined to match an access level, the digital device may provide a user interface to obtain a second fingerprint. Also, if a first fingerprint is not determined to match an access level, the digital device may provide a user interface to obtain another form of authentication input, such as a typed or spoken password, or another type of authentication input. Also, even if a first fingerprint is determined to match an access level, the digital device may provide a user interface to obtain a second form of authentication input, such as a typed or spoken password, or another type of authentication input. Also, the system may be programmed with the ability to set fingerprint-based passwords for selected pages, or selected contents of individual pages, so that a user may be able to store, publish or share a document, while restricting access to portions of the document based on a pre-set password.

Also, the previous discussion of fingerprint traversal of pages is not limited to 1 dimensional/linear page traversal. For example, the use of the previously described fingerprint security may be applied to pages arranged in a 2 two dimensional page layout. Similarly, the use of the previously described fingerprint security is not limited to swiping pages, but may also be applied to touch-based selections of hot links embedded in a table of contents or any other manner of traversing through a document that contains text, images, hot links and other document forms.

Furthermore, the previous discussion of fingerprint based document traversal applies to all manner of documents, including spreadsheets, and photo albums, slide presentations. That is, in each of these examples, pages or portions of pages (e.g., spreadsheet columns, rows or cells) may be protected via one or more fingerprints.

Figure 16:
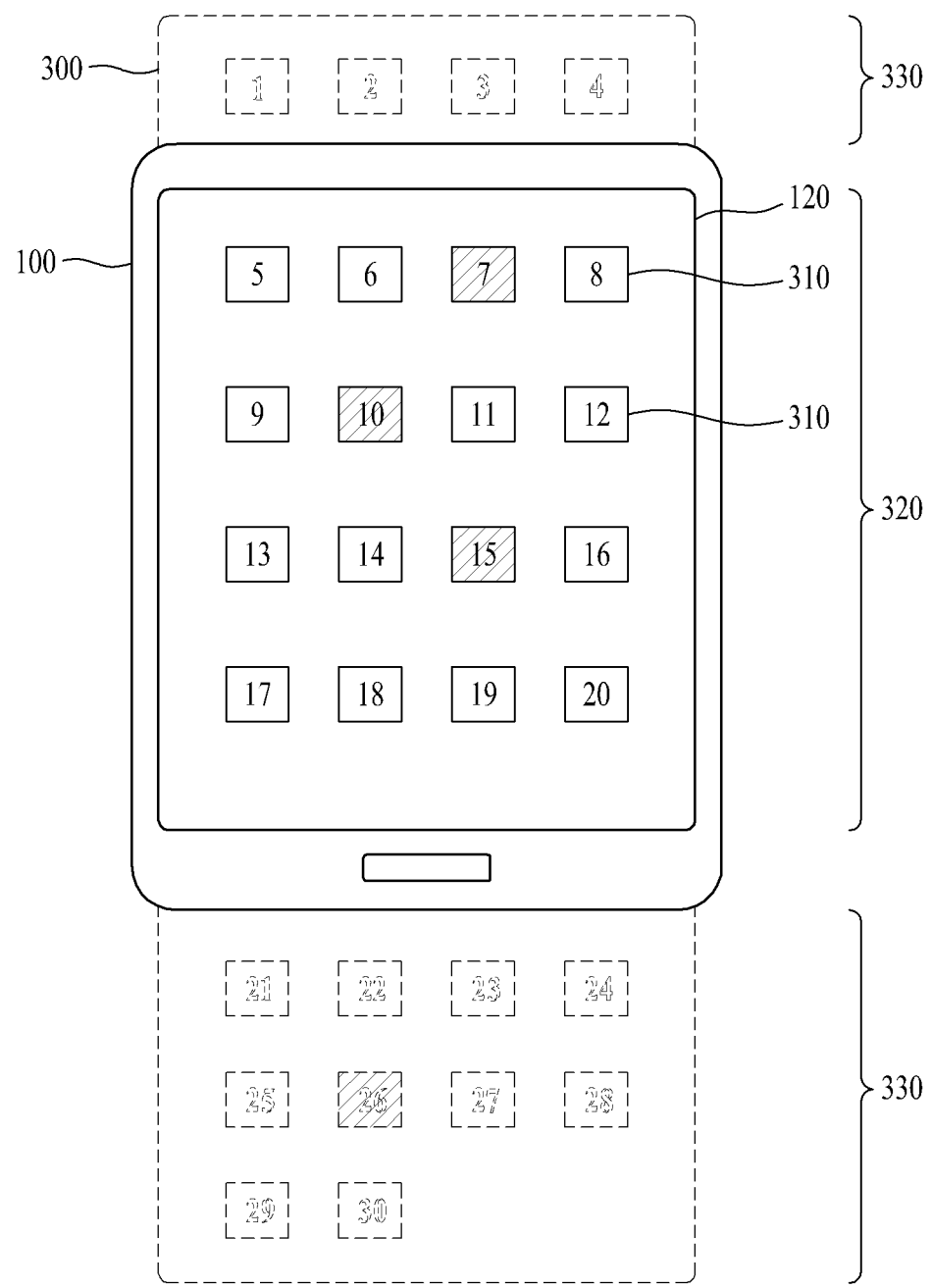
FIG. 16 is a schematic diagram illustrating a thumbnail image page according to the present specification.

FIG. 16 is a schematic diagram illustrating a thumbnail image page 300 according to the present specification.

Referring to FIG. 16, the thumbnail image page 300 is provided to the display unit 120 of the digital device 100.

The processor 110 may provide the thumbnail image page 300 including thumbnail images 310 with respect to at least one piece of visual information to the display unit 120.

In the present specification, visual information refers to data including information visually recognizable by a user through the display unit 120. The visual information is data that can be read and processed by the processor 100 and may correspond to an image file, a video file, a text file and the like.

In the present specification, the thumbnail image 310 refers to a reduced image of part or all of the visual information. A user may easily understand or predict the content of the visual information through the thumbnail image 310.

In the present specification, the thumbnail image page 300 refers to a page including at least one thumbnail image 310. The user may rapidly scan a plurality of thumbnail images 310 to check whether visual information is present or to select desired visual information through the thumbnail image page 300.

The thumbnail image page 300 including thumbnail images 310 respectively corresponding to 30 pieces of visual information will be described for convenience of understanding in the present specification. The thumbnail images are numbered from 1 to 30. Thumbnail images #7, #10, #15 and #26 correspond to visual information for which security is set by a user. Security setting is established by a user of the digital device 100 in order to prevent information about whether visual information is present or the contents thereof from exposure to a third party. However, the aforementioned example does not limit the scope of the present invention disclosed in the present specification.

The size of the thumbnail image page 300 may be larger than the display unit 120. Accordingly, all thumbnail images 310 included in the thumbnail image page 300 may not be simultaneously displayed through the display unit 120. In the present specification, part of the thumbnail image page 300, which is displayed through the display unit 120, is referred to as a first region 320 and the remaining part, which is not displayed through the display unit 120, is referred to as a second region 330.

The sensor unit 130 may output a signal corresponding to user input for scrolling the thumbnail image page 300. Upon reception of the signal, the processor 110 may control the second region 330 located in a direction opposite to a scroll direction to be displayed through the display unit 120.

Figure 17:
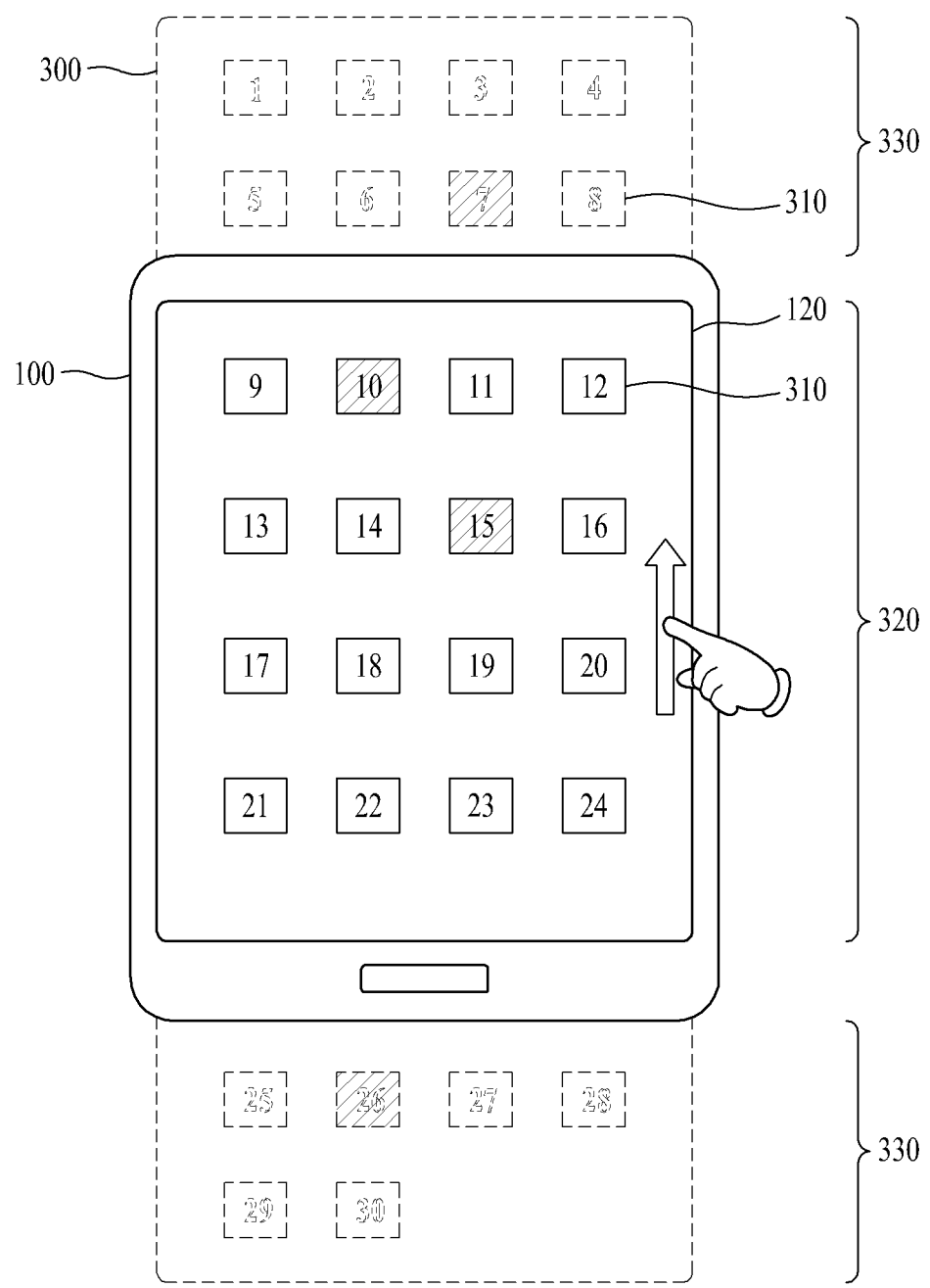
FIG. 17 is a schematic diagram illustrating a change according to an operation of scrolling the thumbnail image page according to the present specification.

FIG. 17 is a schematic diagram illustrating a change according to an operation of scrolling the thumbnail image page according to the present specification.

Referring to FIGS. 16 and 17, the thumbnail image page 300 includes thumbnail images 310 #1 to #30. The thumbnail images 310 of the first region 320 are indicated by solid lines and the thumbnail images 310 of the second region 330 are indicated by dotted lines. FIG. 17 shows that the thumbnail image page 300 has been moved according to upward scrolling of the user. More specifically, thumbnail images #5 to #8 have been moved from the first region 320 to the second region 330 located above the first region 320 and thumbnail images #21 to #24 have been moved to the first region 320 from the second region 330 located below the first region 320. That is, the first region 320 and the second region 330 are not fixed and the positions thereof may be changed within the thumbnail image page 300 according to user input.

The sensor unit 130 may output a signal with respect to security information on the user. According to an embodiment of the present specification, the sensor unit 130 may include a fingerprint sensor. In this case, the security information on the user is fingerprint information of the user. The sensor unit 130 may extract the fingerprint information of the user from user input for scrolling the thumbnail image page 300. According to another embodiment of the present specification, the sensor unit 130 may include a camera that captures an image of the face of the user. In this case, the security information on the user corresponds to information on the face of the user.

The processor 110 may receive the signal with respect to the security information on the user from the sensor unit 130. In addition, the processor 110 may determine whether the security information on the user corresponds to predetermined security information.

When the security information on the user corresponds to the predetermined security information, the processor 110 may provide a first thumbnail image page mode (referred to as "first mode" hereinafter) to the display unit 120. When the security information of the user does not correspond to the predetermined security information, the processor 110 may provide a second thumbnail image page mode (referred to as "second mode" hereinafter) to the display unit 120.

According to an embodiment of the present specification, the thumbnail image page 300 may include thumbnail images with respect to security-set visual information in the first mode and may not include thumbnail images with respect to security-set visual information in the second mode.

The user may selectively set security for visual information such that a third party cannot access or see some visual information. In this case, the processor 110 provides the thumbnail images 310 with respect to security-set visual information to only a user (referred to as "authenticated user" hereinafter) having security information which is received through the sensor unit 130 and corresponds to the predetermined security information. This operation corresponds to the first mode. On the contrary, the processor 110 does not provide the thumbnail images 310 with respect to the security-set visual information to a user (referred to as "unauthenticated user" hereinafter) having security information which is received through the sensor unit 130 and does not correspond to the predetermined security information. This operation corresponds to the second mode.

Figure 18:
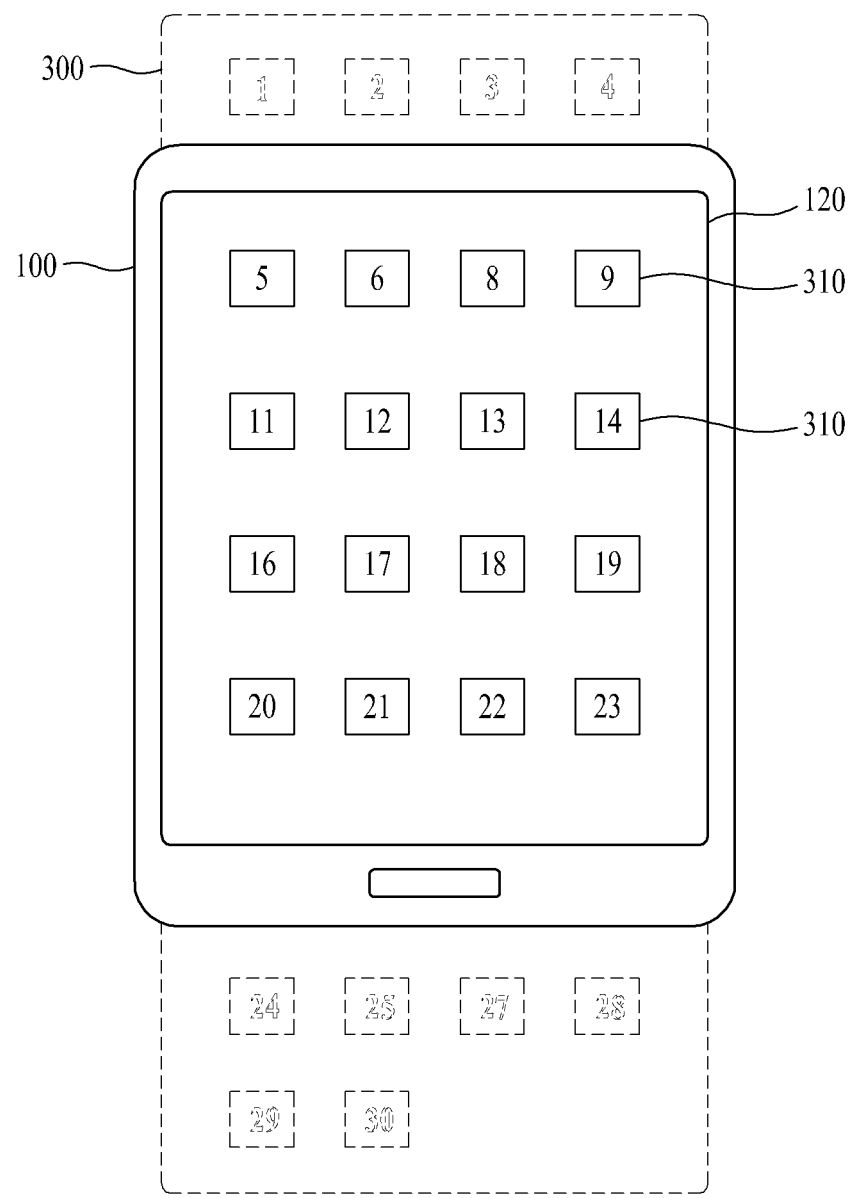
FIG. 18 illustrates a second mode in which a thumbnail image corresponding to visual information for which security is set is not displayed according to an embodiment of the present specification.

FIG. 18 illustrates the second mode in which the thumbnail image page does not include thumbnail images with respect to security-set visual information according to an embodiment of the present specification.

Referring to FIGS. 16 and 18, thumbnail images #7, #10, #15 and #26 are excluded from the thumbnail images 310. As described above, thumbnail images #7, #10, #15 and #26 are thumbnail images 310 with respect to the security-set visual information. For an authenticated user, the processor 110 may provide the thumbnail image page 300 including the thumbnail images 310 with respect to the security-set visual information, that is, the first mode, to the display unit 120. This operation corresponds to the embodiment shown in FIG. 16. For an unauthenticated user, the processor 110 may provide the thumbnail image page 300 that does not include the thumbnail images 310 with respect to the security-set visual information, that is, the second mode to the display unit 120. This operation corresponds to the embodiment shown in FIG. 18.

According to another embodiment of the present specification, a scroll speed of the first mode may be lower than a scroll speed of the second mode. An authenticated user is permitted to look closely at the thumbnail images 310 through a relatively low scroll speed, whereas an unauthenticated user is only permitted to scan the thumbnail images 310 through a relatively high scroll speed.

The embodiment in which there is a scroll speed difference may be applied along with the aforementioned embodiment in which operation is performed according to whether the thumbnail image page 300 includes the thumbnail images 310 with respect to the security-set visual information.

According to another embodiment of the present specification, the number of thumbnail images 310 included in the first region, which corresponds to part of the thumbnail image page and is displayed through the display unit, in the second mode may be greater than the number of thumbnail images 310 included in the first region in the first mode.

Figure 19:
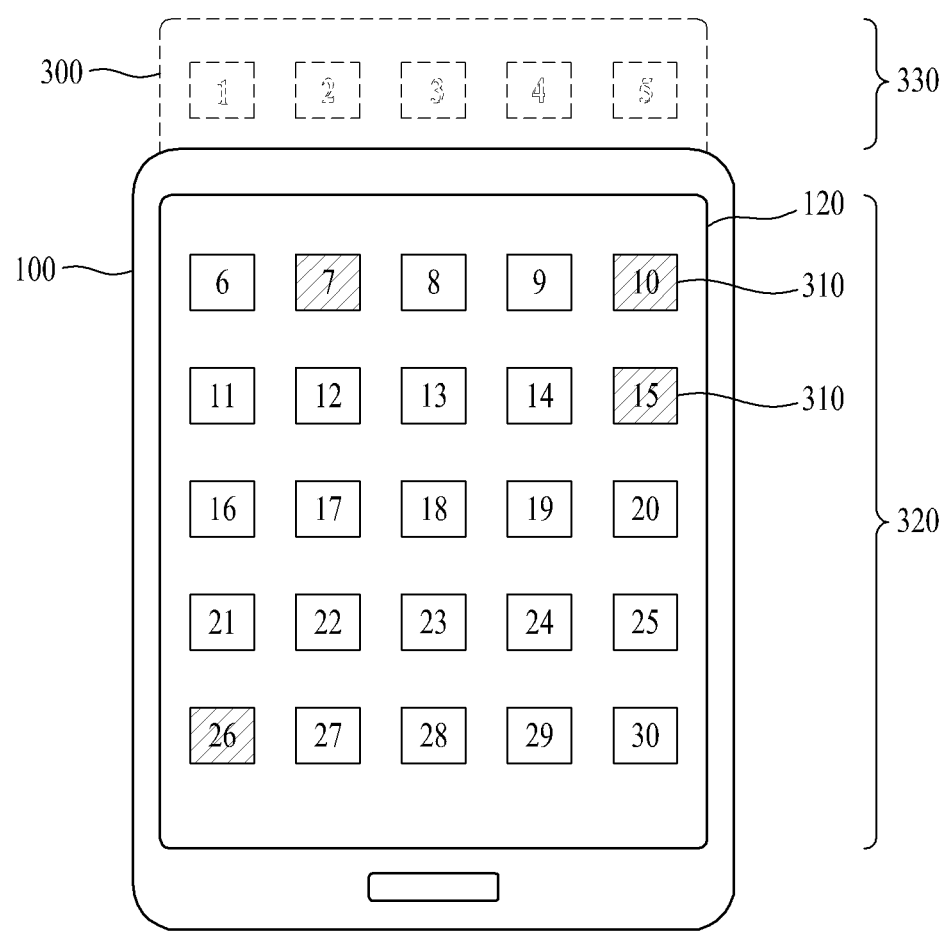
FIG. 19 illustrates a second mode in which the number of thumbnail images included in a first region is greater than the number of thumbnail images included in the first region in a first mode according to another embodiment of the present specification.

FIG. 19 illustrates the second mode in which the number of thumbnail images included in the first region is greater than the number of thumbnail images included in the first region in the first mode according to another embodiment of the present invention.

Referring to FIG. 19, it can be checked that the number of thumbnail images 310 included in the first region 320 is greater than the number of thumbnail images included in the first region 320 in the first mode shown in FIG. 16. The processor 110 provides a relatively small number of thumbnail images 310 through the first region 320 to an authenticated user such that the authenticated user can look closely at the thumbnail images 310. On the contrary, the processor 110 provides a relatively large number of thumbnail images 310 through the first region 320 to an unauthenticated user such that the unauthenticated user cannot look closely at the thumbnail images 310.

The second mode enables a larger number of thumbnail images 310 to be located in the first region 320, compared to the first mode, through a method for increasing the numbers of columns and/or rows of thumbnail images 310 displayed in the first region 320.

The present embodiment in which the number of thumbnail images included in the first region 320 in the first mode is different from the number of thumbnail images included in the first region 320 in the second mode may be applied along with at least one of the embodiment in which operation is performed according to whether the thumbnail image page 300 includes the thumbnail image 310 with respect to security-set visual information and the embodiment in which there is a scroll speed difference.

According to another embodiment, the size of the thumbnail image 310 in the second mode is less than the size of the thumbnail image 310 in the first mode.

Figure 20:
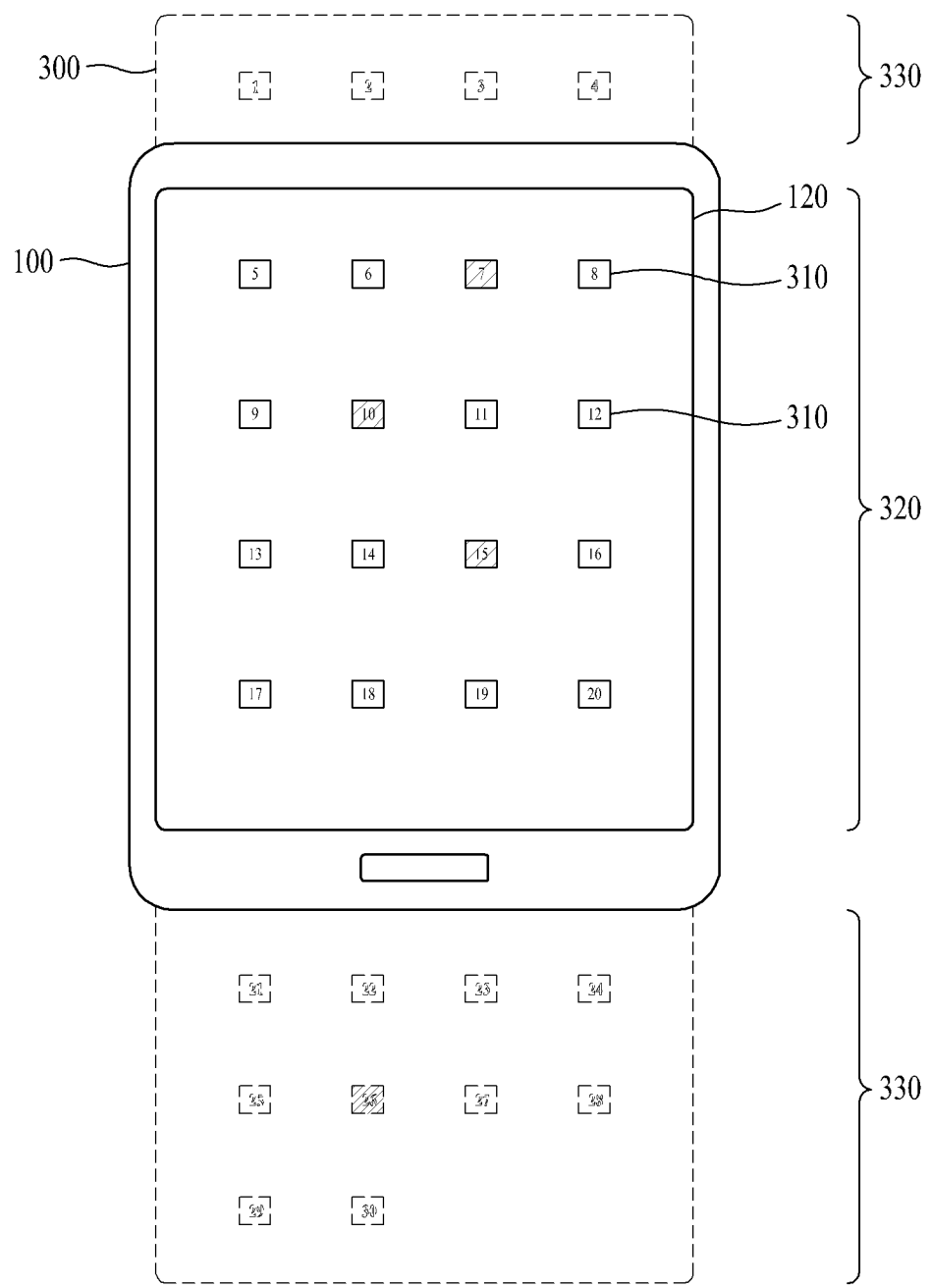
FIG. 20 illustrates a second mode in which the size of a thumbnail image is less than the size of the thumbnail image in the first mode according to another embodiment of the present specification.

FIG. 20 illustrates the second mode in which the size of the thumbnail image is less than the size of the thumbnail image 310 in the first mode.

Referring to FIG. 20, it can be checked that the size of the thumbnail image 310 is less than that in the first mode shown in FIG. 16. The processor 110 provides relatively large thumbnail images 310 to an authenticated user such that the authenticated user can look closely at the thumbnail images 310. On the contrary, the processor 110 provides relatively small thumbnail images 310 to an unauthenticated user such that the unauthenticated user cannot look closely at the thumbnail images 310.

In the second mode, a smaller thumbnail image 310 can be displayed through a method of reducing the vertical and/or horizontal sizes of the thumbnail image, compared to the size of the thumbnail image in the first mode.

The present embodiment in which a thumbnail image in the first mode and a thumbnail image in the second mode have different sizes may be applied along with at least one of the embodiment in which operation is performed according to whether the thumbnail image page 300 includes the thumbnail image 310 corresponding to security-set visual information, the embodiment having a scroll speed difference and the embodiment in which the number of thumbnail images included in the first region 320 in the first mode is different from that in the second mode.

According to an embodiment of the present specification, in the first mode in which the thumbnail image page 300 includes thumbnail images with respect to security-set visual information, the scroll operation may be limited such that a thumbnail image, which is related to security-set visual information and located in the second region 330, is not included in the first region 320 according to scroll input of the user.

Figure 21:
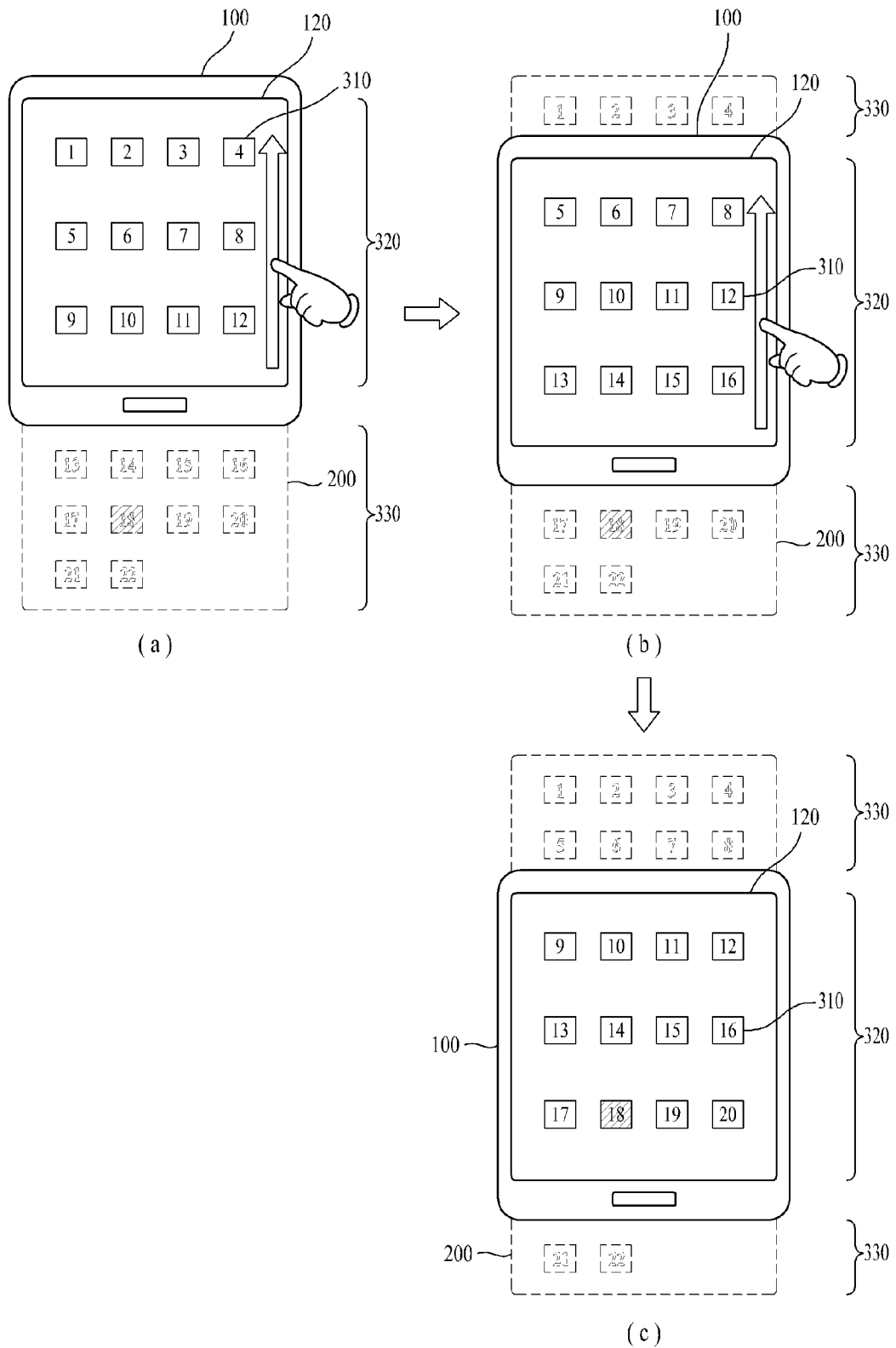
FIG. 21 illustrates a first mode in which a scroll operation is limited such that a thumbnail image with respect to security-set visual information, which is located in a second region, is not included in the first region according to scroll input of a user according to an embodiment of the present specification.

FIG. 21 illustrates the first mode in which the scroll operation is limited such that a thumbnail image, which is related to security-set visual information and located in the second region 330, is not included in the first region 320 according to scroll input of the user.

The embodiment shown in FIG. 21 corresponds to the first mode in which the thumbnail image page 300 includes thumbnail images 310 with respect to security-set visual information. In FIG. 21, thumbnail image #18 is a thumbnail image with respect to the security-set visual information.

Referring to FIG. 21(a), the user performs upward scroll operation. It is assumed that the upward scroll operation corresponds to scroll input capable of simultaneously moving thumbnail images #13 to #20 located in the second region 330 to the first region 320. Accordingly, thumbnail image #18 can be moved to the first region 320 through the scroll operation in a case other than the present embodiment. In the present embodiment, however, the scroll operation can be limited such that the thumbnail image, which corresponds to the security-set visual information and is located in the second region 330, is not included in the first region 320.

Referring to FIG. 21(b), the row including thumbnail image #18 is still located in the second region 330. That is, the scroll operation is limited such that the row including thumbnail image #18 is not moved to the first region 320 although the row including thumbnail images #13 to #16 is moved from the second region 330 to the first region 320.

When scroll input is applied within a predetermined time after when the scroll operation is limited in the first mode according to the present embodiment, a thumbnail image, which corresponds to security-set visual information and is located in the second region 330, can be moved to the first region 320.

Referring to FIGS. 21(b) and (c), scroll input is applied in FIG. 21(b). Here, it is assumed that the scroll input is scroll input applied within a predetermined time after when the scroll operation is limited according to scroll input in FIG. 21(a). Consequently, the row including thumbnail image #18 which is restrained from being moved to the first region 320 is moved to the first region 320, as shown in FIG. 21(c). The predetermined time may be set in various manners according to embodiments.

According to the present embodiment, the user may estimate that thumbnail images 310 corresponding to security-set visual information will be moved to the first region 320 according to scroll input applied by the user. Furthermore, the user may determine whether to move thumbnail images 310 corresponding to security-set visual information to the first region 320 according to scroll input applied by the user.

Referring back to FIG. 16, when the first mode in which the thumbnail images 310 of the security-set visual information are displayed is executed, the authenticated user may not continuously watch the display unit 120 although the first mode is executed by the authenticated user. Accordingly, it is necessary to prevent the thumbnail images 310 of the security-set visual information from being exposed to unauthenticated users.

Figure 22:
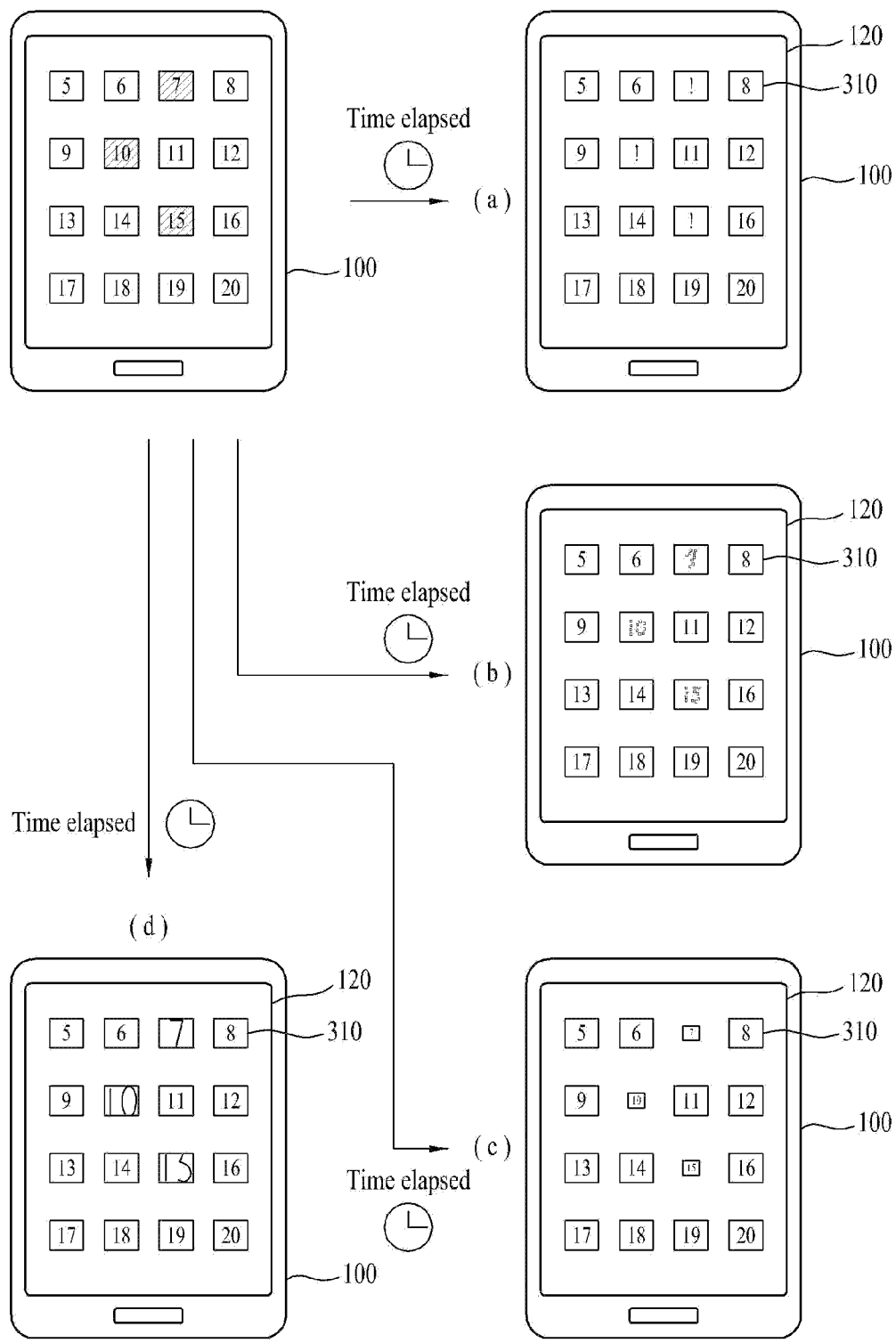
FIG. 22 illustrates a first mode in which a thumbnail image of security-set visual information is replaced by a predetermined thumbnail image after the lapse of a predetermined time from when security information on a user is received according to another embodiment of the present specification.

FIG. 22 illustrates a first mode in which a thumbnail image of security-set visual information is replaced by a predetermined thumbnail image after the lapse of a predetermined time from when security information on a user is received according to another embodiment of the present specification.

According to another embodiment of the present invention, a thumbnail image of the security-set visual information may be replaced by a predetermined thumbnail image after the lapse of a predetermined time from when the security information on the user is received in the first mode. Referring to FIG. 22(a), thumbnail images #7, #10 and #15 of the security-set visual information are replaced by other thumbnail images. The replaced thumbnail images can be set in various manners.

According to another embodiment of the present specification, a thumbnail image of the security-set visual information may be replaced by a thumbnail image of lower definition than the original thumbnail image after the lapse of a predetermined time from when the security information on the user is received in the first mode. Referring to FIG. 22(b), the resolution of thumbnail images #7, #10 and #15 of the security-set visual information is decreased.

According to another embodiment of the present specification, a thumbnail image of the security-set visual information may be replaced by a thumbnail image having a size smaller than the original thumbnail image after the lapse of a predetermined time from when the security information on the user is received in the first mode. Referring to FIG. 22(c), thumbnail images #7, #10 and #15 of the security-set visual information are replaced by thumbnail images having a reduced size.

According to another embodiment of the present specification, a thumbnail image of the security-set visual information may be replaced by a thumbnail image corresponding to part of the security-set visual information after the lapse of a predetermined time from when the security information on the user is received in the first mode. Referring to FIG. 22(d), thumbnail images #7, #10 and #15 of the security-set visual information are replaced by thumbnail images corresponding to parts of the security-set visual information.

According to another embodiment of the present specification, the first mode enables a thumbnail image of the security-set visual information to be excluded from the thumbnail image page 300 after the lapse of a predetermined time from when the security information on the user is received.

Figure 23:
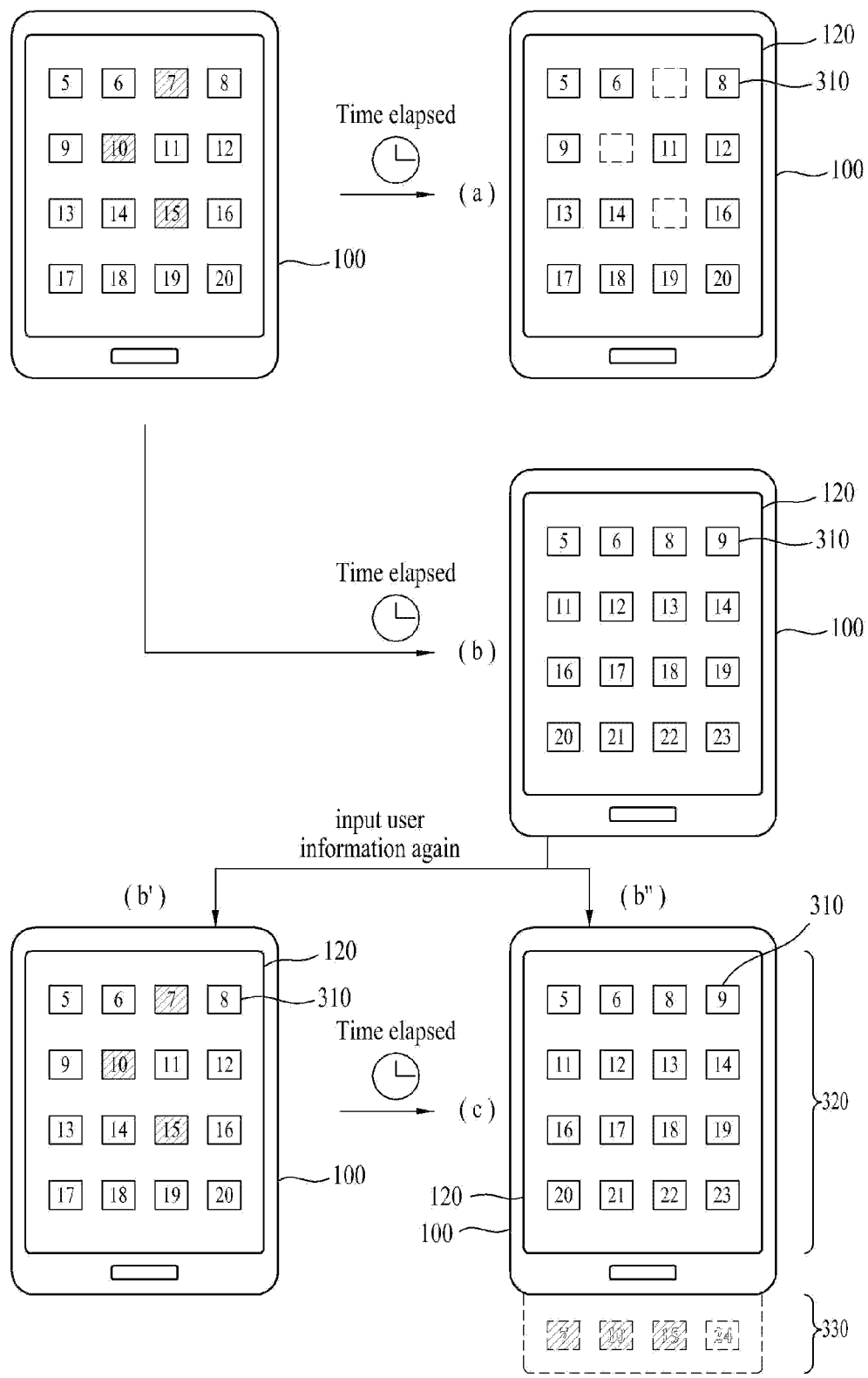
FIG. 23 illustrates a first mode in which a thumbnail image of security-set visual information is excluded from a thumbnail image page after the lapse of a predetermined time from when security information on a user is received according to another embodiment of the present specification.

FIG. 23 illustrates a first mode in which a thumbnail image of security-set visual information is excluded from the thumbnail image page after the lapse of a predetermined time from when security information on a user is received according to another embodiment of the present specification.

According to another embodiment of the present specification, the position corresponding to the excluded thumbnail image may remain empty in the first mode. Referring to FIG. 23(a), the positions corresponding to thumbnail images #7, #10 and #15 remain empty.

According to another embodiment of the present specification, a thumbnail image of visual information for which security is not set may be moved to the original position of the excluded thumbnail image. Referring to FIG. 23(b), positions from which thumbnail images #7, #10 and #15 have been removed are filled with other thumbnail images. Consequently, the thumbnail image page 300 may have the same form as that displayed in the second mode in which the thumbnail images 310 of the security-set visual information are not displayed.

In the present embodiment, when security information on a user, which is received after the thumbnail image of the visual information for which security is not set is moved to the position of the excluded thumbnail image, is consistent with predetermined security information, the excluded thumbnail image of the security-set visual information may be returned to the original position in the first region 320. Referring to FIG. 23(b'), thumbnail images #7, #10 and #15 are returned to the original positions in the first region 320.

In the present embodiment, when security information on a user, which is received after the thumbnail image of the visual information for which security is not set is moved to the position of the excluded thumbnail image, is consistent with the predetermined security information, the excluded thumbnail image of the security-set visual information may be disposed in the second region 330. Referring to FIG. 23(b''), thumbnail images #7, #10 and #15 are located in the second region 330. In this case, thumbnail images #7, #10 and #15 may be moved to the first region (320) according to scroll input of the user.

A description will be given of a method for controlling the digital device 100 including the processor 110 which controls the display unit 120 to display the thumbnail image page 300 with respect to at least one piece of visual information. Since the constituent elements of the digital device 100 have been described in detail, redundant description is omitted in the method for controlling the digital device.

Figure 24:
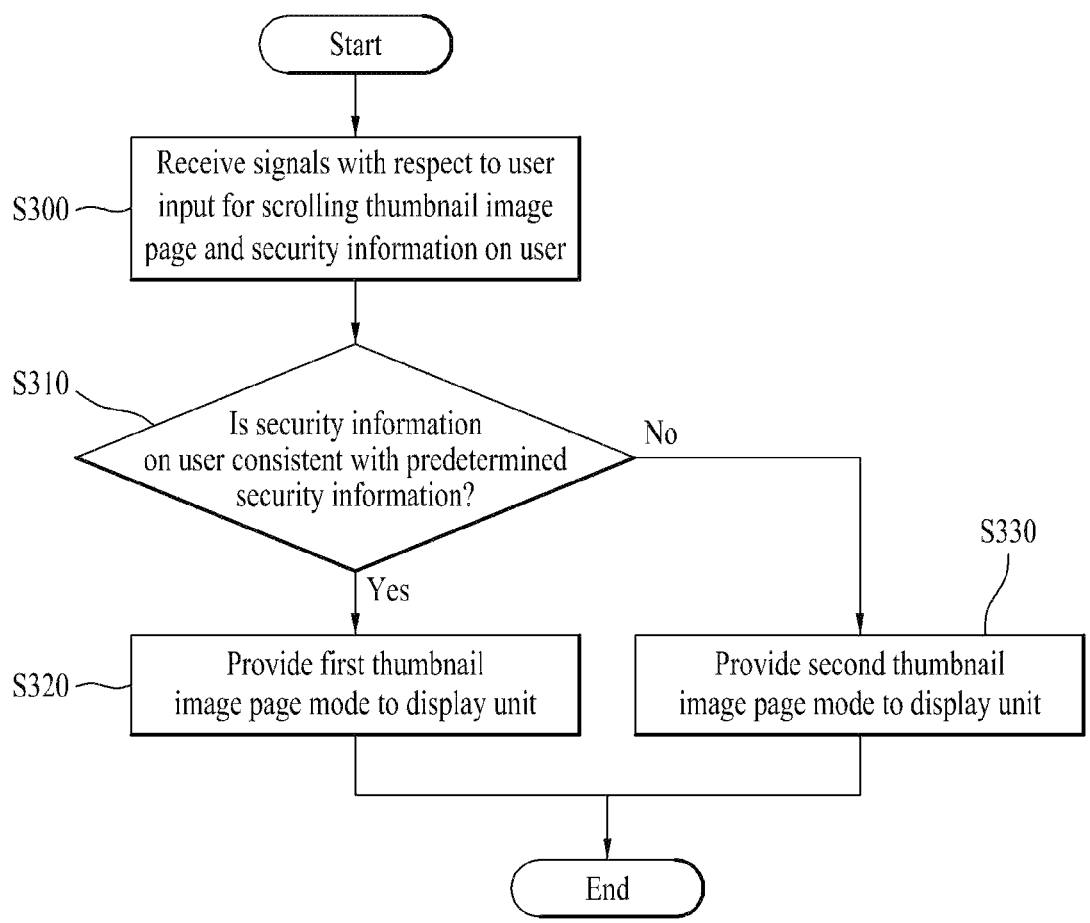
FIG. 24 is a flowchart illustrating a method for controlling a digital device according to an embodiment of the present specification.

FIG. 24 is a flowchart illustrating the method for controlling the digital device according to an embodiment of the present specification.

Referring to FIG. 24, the processor 110 receives, from the sensor unit 130, user input for scrolling the thumbnail image page 300 and a signal with respect to security information on a user in step S300. Upon completion of the present step, the processor 110 proceeds to step S310.

The processor 110 determines whether the security information on the user is consistent with predetermined security information in step S310. When the security information on the user is consistent with the predetermined security information (YES in step S310), the processor 110 proceeds to step S320. When the security information on the user is not consistent with the predetermined security information (NO in step S310), the processor 110 proceeds to step S330.

The processor 110 provides a first thumbnail image page mode (first mode) to the display unit 120 in step S320.

In the first mode, the thumbnail image page 300 may include thumbnail images 310 corresponding to security-set visual information. This has been described in detail with reference to FIG. 16 and thus repeated description is omitted.

According to an embodiment of the present specification, a scroll speed of the first mode may be lower than that of the second mode. This has been described in detail and thus repeated description is omitted.

According to an embodiment of the present specification, scrolling of the thumbnail image page 300 may be limited such that a thumbnail image, which is related to the set-security visual information and located in the second region 330 that is not displayed through the display unit 120 while being included in the thumbnail image page 300, is not included in the first region 320 according to scroll input of the user in the first mode in which the thumbnail image page 300 displays thumbnail images with respect to the security-set visual information. When scroll input is applied within a predetermined time after the scrolling is limited, the thumbnail image, which is related to the security-set visual information and located in the second region 330, may be displayed in the first region 310. Since the present embodiment has been described in detail with reference to FIG. 21, repeated description is omitted.

According to another embodiment of the present specification, a thumbnail image of the security-set visual information may be replaced by a predetermined thumbnail image after the lapse of a predetermined time from when the security information on the user is received in the first mode in which the thumbnail image page 300 displays thumbnail images of the security-set visual information. As the present embodiment has been described in detail with reference to FIG. 22(a), a repeated description is omitted.

According to another embodiment of the present specification, a thumbnail image of the security-set visual information may be replaced by a thumbnail image of lower resolution than the original thumbnail image after the lapse of a predetermined time from when the security information on the user is received in the first mode in which the thumbnail image page 300 displays thumbnail images of the security-set visual information. As the present embodiment has been described in detail with reference to FIG. 22(b), a repeated description is omitted.

According to another embodiment of the present specification, a thumbnail image of the security-set visual information may be replaced by a thumbnail image having a smaller size than the original thumbnail image after the lapse of a predetermined time from when the security information on the user is received in the first mode in which the thumbnail image page 300 displays thumbnail images of the security-set visual information. As the present embodiment has been described in detail with reference to FIG. 22(c), a repeated description is omitted.

According to another embodiment of the present specification, a thumbnail image of the security-set visual information may be replaced by a thumbnail image corresponding to part of the security-set visual information after the lapse of a predetermined time from when the security information on the user is received in the first mode in which the thumbnail image page 300 displays thumbnail images of the security-set visual information. As the present embodiment has been described in detail with reference to FIG. 22(d), a repeated description is omitted.

According to another embodiment of the present specification, a thumbnail image of the security-set visual information may be excluded from the thumbnail image page 300 after the lapse of a predetermined time from when the security information on the user is received in the first mode in which the thumbnail image page 300 displays thumbnail images of the security-set visual information. In this case, the original position of the excluded thumbnail image may remain empty and a thumbnail image of visual information for which security is not set may be moved to the original position of the excluded thumbnail image. As the present embodiment has been described in detail with reference to FIGS. 23 (a) and (b), a repeated description is omitted. When security information on a user, which is received after the thumbnail image of the visual information for which security is not set is moved to the position of the excluded thumbnail image, is consistent with the predetermined security information, the excluded thumbnail image of the security-set visual information may be returned to the original position in the first region 320. As the present embodiment has been described in detail with reference to FIG. 23 (c), a repeated description is omitted. In addition, when security information on a user, which is received after the thumbnail image of the visual information for which security is not set is moved to the position of the excluded thumbnail image, is consistent with the predetermined security information, the excluded thumbnail image of the security-set visual information may be located in the second region 330. As the present embodiment has been described in detail with reference to FIG. 23 (d), a repeated description is omitted.

The processor 110 provides a second thumbnail image page mode (second mode) to the display unit 120 in step S330.

In the second mode, the thumbnail image page may not include thumbnail images with respect to the security-set visual information. The present embodiment has been described in detail with reference to FIG. 18 so that repeated description is omitted.

According to an embodiment of the present specification, the number of thumbnail images included in the first region 320, which is included in the thumbnail image page and displayed through the display unit, in the second mode may be greater than the number of thumbnail images included in the first region 320 in the first mode. As the present embodiment has been described in detail with reference to FIG. 19, a repeated description is omitted.

According to another embodiment of the present specification, the size of the thumbnail image 310 in the second mode may be less than that in the first mode. As the present embodiment has been described in detail with reference to FIG. 20, a repeated description is omitted.

In the embodiments of the present specification, the digital device includes a display unit such as a TV receiver, a computer, a notebook computer, a cellular phone, a portable device or the like, and various types of devices capable of outputting content to the display unit.

It will be obvious to those skilled in the art that claims that are not explicitly cited in each other in the appended claims may be presented in combination as an exemplary embodiment of the present specification or included as a new claim by a subsequent amendment after the application is filed.

Various embodiments have been described in the best mode for carrying out the invention.

As described above, the present specification is totally or partially applicable to electronic devices.

What is claimed is:

1. A digital device, comprising:
a sensor unit configured to output user input or information as a signal;
a display unit configured to output images; and
a processor configured to receive the signal from the sensor unit and to control the display unit,
wherein the processor is further configured to:
provide, to the display unit, a thumbnail image page including a thumbnail image with respect to at least one visual information,
wherein the sensor unit is configured to output signals with respect to user input for scrolling the thumbnail image page and security information on a user,
wherein the processor is configured to provide a first mode, the first mode being a first thumbnail image page mode, to the display unit when the security information on the user corresponds to predetermined security information and to provide a second mode, the second mode being a second thumbnail image page mode, to the display unit when the security information on the user does not correspond to the predetermined security information,
wherein the thumbnail image page includes thumbnail images with respect to the at least one visual information for which security is set in the first mode and does not include thumbnail images with respect to the at least one visual information for which security is set in the second mode, and wherein the first mode enables the thumbnail images to be replaced by predetermined thumbnail images after a lapse of a predetermined time from when the security information on the user is received.

2. The digital device according to claim 1, wherein a scroll speed of the first mode is lower than a scroll speed of the second mode.

3. The digital device according to claim 1, wherein the number of thumbnail images included in a first region that is included in the thumbnail image page and displayed through the display unit in the second mode is greater than the number of thumbnail images included in the first region in the first mode.

4. The digital device according to claim 1, wherein the size of the thumbnail images in the second mode is less than the size of the thumbnail images in the first mode.

5. The digital device according to claim 1, wherein a scroll operation is limited such that the thumbnail images, related to the at least one visual information for which security is set and located in a second region, is not included in a first region included in the thumbnail image page and displayed through the display unit according to scroll input of a user in the first mode, the second region being included in the thumbnail image page but not being displayed through the display unit.

6. The digital device according to claim 5, wherein the first mode enables the thumbnail images, related to the at least one visual information for which security is set and located in the second region, to be included in the first region when scroll input is applied within a predetermined time after the scroll operation is limited.

7. The digital device according to claim 1, wherein the predetermined thumbnail images are thumbnail images of lower definition than the thumbnail images with respect to the at least one visual information for which security is set.

8. The digital device according to claim 1, wherein the predetermined thumbnail images are smaller thumbnail images than the thumbnail images with respect to the at least one visual information for which security is set.

9. The digital device according to claim 1, wherein the predetermined thumbnail images are thumbnail images corresponding to part of the visual information for which security is set.

10. The digital device according to claim 1, wherein the first mode enables the thumbnail images of the at least one visual information for which security is set to be excluded from the thumbnail image page after the lapse of a predetermined time from when the security information on the user is received.

11. The digital device according to claim 10, wherein the first mode enables a position corresponding to the excluded thumbnail images to remain empty.

12. The digital device according to claim 10, wherein the first mode enables thumbnail images of the at least one visual information for which security is not set to be moved to the position of the excluded thumbnail image.

13. The digital device according to claim 12, wherein the first mode enables the excluded thumbnail images of the at least one visual information for which security is set to be returned to the original position thereof in a first region included in the thumbnail image page and displayed through the display unit, when security information on a user, received after the thumbnail images of the at least one visual information for which security is not set is moved to the position of the excluded thumbnail image, is consistent with predetermined security information.

14. The digital device according to claim 12, wherein the first mode enables the excluded thumbnail images of the at least one visual information for which security is set to be located in a second region included in the thumbnail image page but not displayed through the display unit, when security information on a user, received after the thumbnail images of the at least one visual information for which security is not set is moved to the position of the excluded thumbnail images, is consistent with predetermined security information.

15. The digital device according to claim 1, wherein the sensor unit further includes a fingerprint sensor,
wherein the security information on the user corresponds to fingerprint information of the user.

16. The digital device according to claim 15, wherein the fingerprint sensor is configured to extract fingerprint information of a user from user input for scrolling the thumbnail image page.

17. The digital device according to claim 1, wherein the sensor unit further includes a camera capturing an image of a user's face,
wherein the security information on the user corresponds to information on the user's face.

18. A method for controlling a digital device including a processor configured to control a thumbnail image page including thumbnail images with respect to at least one visual information to be displayed through a display unit, the method comprising:
  (a) the processor receiving, from a sensor unit, signals with respect to user input for scrolling the thumbnail image page and security information on a user;
  (b) the processor determining whether the security information on the user corresponds to predetermined security information; and
  (c) the processor providing a first mode, the first mode being a first thumbnail image page mode, to the display unit when the security information on the user corresponds to the predetermined security information and providing a second mode, the second mode being a second thumbnail image page mode, to the display unit when the security information on the user does not correspond to the predetermined security information,
wherein the thumbnail image page includes thumbnail images with respect to the at least one visual information for which security is set in the first mode and does not include thumbnail images with respect to the at least one visual information for which security is set in the second mode, and
wherein the first mode enables thumbnail images of the at least one visual information for which security is set to be replaced by predetermined thumbnail images after a lapse of a predetermined time from when the security information on the user is received.

* * * * *